(12) United States Patent
Covert

(10) Patent No.: US 9,052,047 B2
(45) Date of Patent: Jun. 9, 2015

(54) QUICK CONNECT COUPLER FOR GLASS CONTAINER MOLDING MACHINE

(76) Inventor: Keith Covert, Winchester, IN (US)

( * ) Notice: Subject to any disclaimer, the term of this patent is extended or adjusted under 35 U.S.C. 154(b) by 242 days.

(21) Appl. No.: 13/134,296

(22) Filed: Jun. 2, 2011

(65) Prior Publication Data

US 2011/0298208 A1    Dec. 8, 2011

Related U.S. Application Data

(60) Provisional application No. 61/396,794, filed on Jun. 3, 2010.

(51) Int. Cl.
  *F16L 39/00* (2006.01)
  *F16L 37/22* (2006.01)

(52) U.S. Cl.
  CPC .................................... *F16L 37/22* (2013.01)

(58) Field of Classification Search
  USPC ............... 285/321, 314–317, 396, 402, 81
  See application file for complete search history.

(56) References Cited

U.S. PATENT DOCUMENTS

| | | | | |
|---|---|---|---|---|
| 2,377,812 A * | 6/1945 | Scheiwer | 285/277 |
| 2,744,770 A * | 5/1956 | Davidson et al. | 285/316 |
| 2,823,934 A * | 2/1958 | Gorrell et al. | 285/277 |
| 3,302,960 A * | 2/1967 | Herrmann | 403/325 |
| 3,602,581 A * | 8/1971 | Heine | 351/211 |
| 3,666,300 A * | 5/1972 | Russell | 285/316 |
| 4,124,228 A * | 11/1978 | Morrison | 285/1 |
| 4,311,328 A * | 1/1982 | Truchet | 285/308 |
| 4,366,945 A * | 1/1983 | Blauenstein | 251/149.6 |
| 4,444,223 A * | 4/1984 | Maldavs | 137/614.04 |
| 4,543,993 A * | 10/1985 | Calvin et al. | 137/614.03 |
| 4,543,994 A * | 10/1985 | Johnson et al. | 137/614.04 |
| 4,546,956 A * | 10/1985 | Moberg | 251/149.6 |
| 4,583,711 A * | 4/1986 | Johnson | 251/149.6 |
| 4,615,545 A * | 10/1986 | Cruse | 285/24 |
| 4,676,269 A * | 6/1987 | Sarson | 137/614.06 |
| 4,691,941 A * | 9/1987 | Rabushka et al. | 285/1 |
| 4,723,797 A * | 2/1988 | Veyrat | 285/316 |
| 4,765,657 A * | 8/1988 | Cruse | 285/91 |
| 4,825,893 A * | 5/1989 | Gailey | 137/75 |
| 4,865,292 A * | 9/1989 | Ekman | 251/149.6 |
| 5,451,031 A * | 9/1995 | Purvis et al. | 251/89.5 |
| 5,873,386 A * | 2/1999 | Arosio | 137/614.02 |

(Continued)

*Primary Examiner* — Aaron Dunwoody
(74) *Attorney, Agent, or Firm* — E. Victor Indiano; Indiano Law Group LLC

(57) ABSTRACT

A quick connect coupler for use with a glass container molding machine is provided, for coupling a mold member to a mold moving member. The coupler includes a first coupler member that is configured to be coupled to one of the mold member and the mold moving member, and a second coupling member. The second coupling member is configured for being coupled to the other of the mold member and the mold moving member. The first coupler member includes a first coupler body and at least one grip member movable relative to the first coupler body between a second coupler engaging position and a second coupler release position. A non-threaded grip engaging member is movable between a grip engaging position wherein the grip engaging member holds the grip member in a second coupler engaging position and a grip releasing position in which the grip engaging member permits the grip member to move to the second coupler release position. The second coupler is selectively engageable with the first coupler member. The second coupler member includes a grip receiving portion for receiving the grip member when the grip member is in the second coupler engaging position.

15 Claims, 17 Drawing Sheets

(56) References Cited

U.S. PATENT DOCUMENTS

| | | | |
|---|---|---|---|
| 5,941,574 A * | 8/1999 | Hamilton et al. | 285/3 |
| 6,129,334 A * | 10/2000 | Kuwabara | 251/149.6 |
| 6,412,828 B1 * | 7/2002 | Lacroix et al. | 285/316 |
| 6,527,783 B1 * | 3/2003 | Ignon | 606/131 |
| 6,568,717 B1 * | 5/2003 | Le Clinche | 285/315 |
| 6,890,004 B2 * | 5/2005 | Naito | 285/93 |
| 7,007,983 B2 * | 3/2006 | Arosio | 285/316 |
| 7,118,089 B2 * | 10/2006 | Mikiya et al. | 251/149.2 |
| 7,699,290 B2 * | 4/2010 | Chang | 251/149.9 |
| 7,731,243 B2 * | 6/2010 | Tiberghien et al. | 285/316 |
| 7,766,393 B2 * | 8/2010 | Tiberghien et al. | 285/317 |
| 8,123,258 B2 * | 2/2012 | Tiberghien et al. | 285/316 |
| 8,191,932 B2 * | 6/2012 | Davis | 285/316 |
| 8,205,914 B2 * | 6/2012 | Chappaz et al. | 285/276 |
| 8,251,407 B2 * | 8/2012 | Tiberghien et al. | 285/316 |
| 8,256,803 B2 * | 9/2012 | Takahashi | 285/316 |
| 2004/0094957 A1 * | 5/2004 | Walmsley et al. | 285/307 |
| 2005/0046178 A1 * | 3/2005 | Sato et al. | 285/81 |
| 2005/0121906 A1 * | 6/2005 | Tiberghien et al. | 285/316 |
| 2006/0069345 A1 * | 3/2006 | Anderson et al. | 604/68 |
| 2007/0257485 A1 * | 11/2007 | Arosio | 285/316 |
| 2007/0278791 A1 * | 12/2007 | Tiberghien et al. | 285/315 |
| 2009/0021007 A1 * | 1/2009 | Le Bars et al. | 285/317 |
| 2009/0085348 A1 * | 4/2009 | Tiberghien et al. | 285/316 |

* cited by examiner

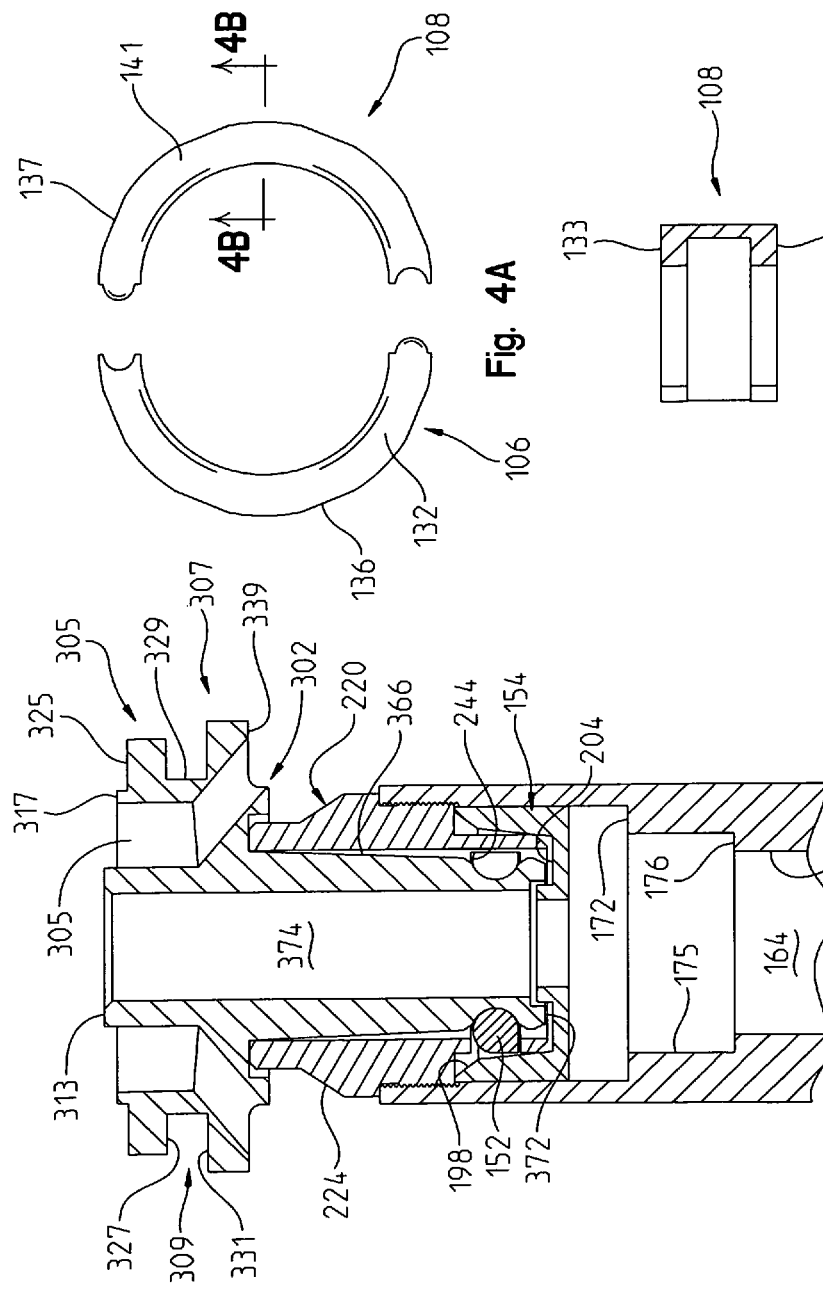

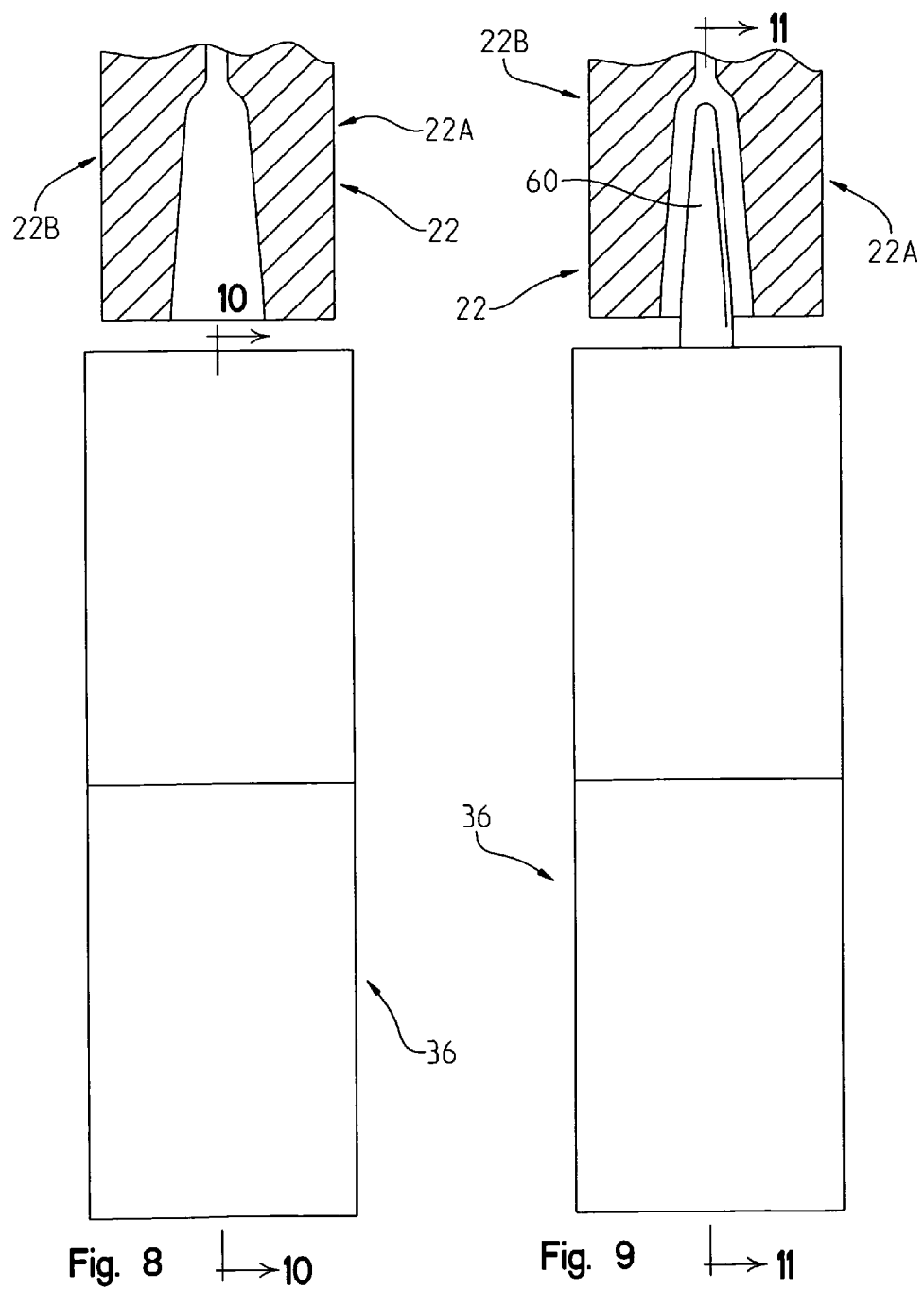

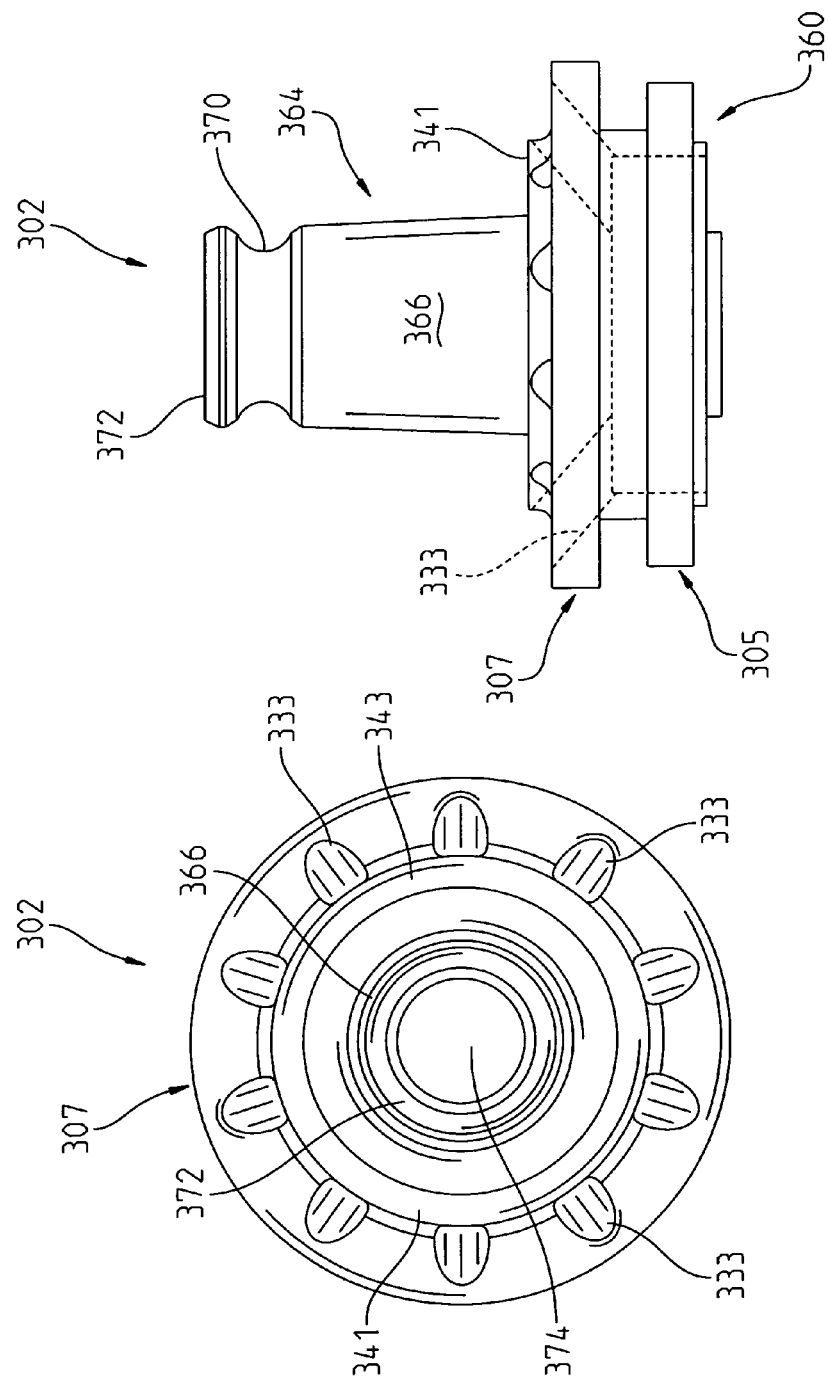

QUICK CONNECT COUPLER FOR GLASS CONTAINER MOLDING MACHINE

I. PRIORITY STATEMENT

The instant application claims benefit to Keith Covert, U.S. Provisional Patent Application No. 61/396,794, that was filed on 3 Jun. 2010, and that is fully incorporated herein.

II. TECHNICAL FIELD OF THE INVENTION

The present invention relates to glass forming devices, and more particularly, to a quick change connector for use in a plunger a glass container forming mold assembly for facilitating changes of a mold member.

II. BACKGROUND OF THE INVENTION

A large number of products are currently packaged in glass bottles, including such products include pickles, mayonnaise, and beverages, such as beer. Glass containers are usually made in modern glass container factories that typically comprise three primary operation areas. These three operation areas include the batch house, the hot end and the cold end.

The batch house is the area of the operation that handles the raw materials, such as the sand, sodium oxide, calcium oxide and the like, from which the glass is made. The hot end handles the manufacturing of the glass container from the raw materials, and includes equipment such as furnaces, annealing ovens, and forming machines. The cold end area of the operation handles the product inspection and packaging equipment, and may also contain the filling stations wherein the filler material (e.g. beer) is placed within the glass container.

The hot end of a glass works is the area of the plant where the molten glass is formed into glass products. The first machine in the hot end of the glass works is usually a furnace and its feeder, wherein a batch of raw materials is fed into a furnace at a slow controlled rate. Often, these furnaces operate at temperatures of up to about 1575° C. and produce a stream of molten glass. This stream of molten glass that emerges from the furnace is then made into a glass container.

There are currently two primary methods of making a glass container from this stream of molten glass, including the "blow and blow" method and the "press and blow" method. In both cases, a cylindrical stream of molten glass at its plastic temperature (typically somewhere between 1050° C. and 1200° C.) is cut with a shearing blade to form a cylinder of glass. This cylinder of glass is called a "gob". The gob is then caused to fall by gravity and is guided by troughs and chutes into a blank "female" mold.

In the press and blow process with which the quick change plunger of the present invention is best employed, the solid gob of glass is converted into a parison having a hollow interior. A parison is a pre-container, and is generally somewhat cylindrically shaped, and does not yet include an exterior surface that mirrors the interior contours of the female mold that will give the bottle it its final shape.

The parison is formed in the press and blow process by the use of a metal plunger. The metal plunger is inserted into the gob to form a hollow interior cavity while pushing the glass out, and into the blank female mold. After the plunger is inserted into the interior of the gob (through what in the final bottle will be the open end of the bottle), the mold is flipped over. The glass is then blown out into the mold, through the introduction of compressed air into the interior cavity in the parison that is formed by the metal plunger. After the glass is blown out into its final form, it can then be cooled.

In a typical glass container plant, different types of containers are often manufactured on the same production line. This requires that plungers be changed from time to time. Additionally, plungers are subject to wear out and breakage, thus requiring that they be replaced. Currently, replacing a plunger is a difficult and time consuming operation. The difficulty of replacement is exacerbated by the fact that the plunger and mold are usually very hot, thus leading to a risk of burns and discomfort to the person changing out the broken plunger. The time consuming nature of the process adversely economically impacts the container making operation since it requires that the mold with which the plunger is used go "off-line" during the plunger replacement process.

Normally, a plunger is threadedly coupled to an axially movable piston that is positioned directly under the female mold, into the which the gob is poured, and in which the parison is formed. An example of such a female mold is shown in FIG. 1, that includes three separate cavities, 20, 22, 24. The three cavities are split into first and second halves 20A and 20B; 22A and 22B; and 24A and 24B. The halves of the female mold can come apart so that a formed bottle can be removed from the interior of the mold.

This "apart" configuration is shown in FIG. 1. However, the halves can be placed adjacent to each other so that they are together so that, for example, half 20A is placed adjacent to half 20B to sealingly engage half 20B when a gob is placed within the female mold 20, to form a bottle. The plunger assembly 40 is positioned under the mold assembly 20. Because of this close proximity, it is often difficult for a worker to get in, and remove the plunger as the plunger is in such close proximity to the female mold.

As such, it is therefore one object of the present invention to provide a device and method that facilitates replacing the plunger in a glass container mold making machine.

III. SUMMARY OF THE INVENTION

In accordance with the present invention, a quick connect coupler is provided for use with a glass container molding machine, for coupling a mold member to a mold moving member. The quick connect coupler comprises a first coupler member that is configured to be coupled to one of the mold member and the mold moving member, and a second coupler member. The second coupler member is configured for being coupled to the other of the mold member and the mold moving member. The first coupler member includes a first coupler body. At least one grip member is movable relative to the first coupler body between a second coupler engaging position and a second coupler release position. A non-threaded grip engaging member is movable between a grip engaging position wherein the grip engaging member holds the grip member in a second coupler engaging position and a grip releasing position. In the grip releasing position, the grip engaging member permits the grip member to move to the second coupler release position.

The second coupler is selectively engageable with the first coupler member. The second coupler member includes a grip receiving portion for receiving the grip member when the grip member is in the second coupler engaging position. Preferably, the grip members are movable in a generally radial direction, and the socket for receiving the coupler includes a generally axially facing opening for receiving the second coupler member generally coaxially with the second coupler body. The grip engaging member moves in a generally axial direction to engage the socket member to engage the second coupler member.

The second coupler member preferably has an exterior surface that includes a recessed groove portion sized for receiving the at least two grip members. The grip members are insertable into the groove portion when in the coupler engaging position. The engagement of the grip members and the groove portion prevents axial movement of the second coupler member, to thereby maintain the second coupler member in a fixed position within the first coupler member socket.

In a most advantageous embodiment, the grip engaging member includes a base portion and a wall portion, wherein the wall portion is positioned radially outwardly of the grip members and the grip engaging member is in the grip engaging position, and is disposed in an axially offset position when in the grip releasing position, so that the grip members can occupy at least a portion of the space that was occupied by the wall portion wherein the grip engaging member was in the grip engaging position.

Additionally, a biasing member such as a spring can be provided for normally biasing the grip engaging member in the second coupler engaging position. The grip engaging member preferably is cup shaped, and includes a grip engaging tool receiving portion and a grip member engaging portion.

The first coupler body can include a first body element and a second body element. In such a case, the first body element can be configured to be coupled to the at least one of the mold member and moving member, and the second body element can be configured to provide support to the second coupling member. The first and second body elements are detachably coupled to each other, and are preferably detachably coupled to each other through a bayonet-type coupler. The second coupler and the second body element preferably include a series of apertures that are in fluid communication with each other, and further are in fluid communication with a hollow interior of the mold member. This fluid communication enables the passage of air between the interior of the mold member, and a place exterior to the interior hollow portion of the mold member.

One feature of the present invention is that it provides a quick coupling mechanism whereby a plunger can be rapidly removed from and attached to a piston in a glass container mold manufacturing process.

Heretofore, the changing of a plunger was a rather difficult and time consuming procedure that often led to worker injuries. In prior known devices, the plunger member included a coupler, that was threadedly engaged to the piston. In order to remove the plunger from the piston, one needed to threadedly disengage the plunger from the piston.

One difficulty with this procedure is that the machine technician was required to perform a difficult unthreading and rethreading operation in a cramped space on a very hot device. As such, the technician was provided with little room to maneuver or place his hands and arms around a device having components heated by molten glass, therefore resulting in technicians often getting burned during the replacement process.

Additionally, the process for unthreading the old plunger off of the piston and rethreading the new plunger on to the piston was unnecessarily time consuming. As a glass container plant achieves efficiencies by making glass containers at a high rate of speed, any slow down of the line (a one or more of its molds), or shut down of the line caused by the need to replace a plunger can result in significant cost to the glass containing manufacturing plant, since down time prevents production from occurring until the plunger is replaced. Although one might not need to shut down the entire plant, one would delay production at least on the mold gang for which the particular plunger was being replaced.

One advantage of the present invention is that this plunger replacement can be done much more quickly and without a threading operation. This not only reduces the down time for the molding machine, but also makes the plunger replacement operation safer. On the present invention, the removal and re-insertion of the plunger can be performed largely from a position above the mold such that it does not require the machine technician to place his hands for a significant period of time in close proximity to the very hot mold and/or very hot plunger of the mold making device. The quick coupling mechanism of the present invention thereby achieves the advantage of reducing machine downtime, and thus for improving production efficiencies while also having the potential to improve plant safety and reduce injuries.

These and other features of the present invention will become apparent to those skilled in the art upon a review of the best mode of perceived presently of practicing the invention, as described below in the attached drawing and detailed description of the preferred embodiment.

III. BRIEF DESCRIPTION OF DRAWINGS

FIG. 4 is an assembled view of the quick release plunger coupler of the present invention, showing the plunger coupled to a piston;

FIG. 4A is a top view of the first and second clip members of the invention that are used to couple the plunger member to the second coupling member;

FIG. 4B is a sectional view taken along lines 4B-4B of FIG. 4A;

FIG. 8 is a side view, of the male mold member plunger and piston assembly of the present invention, showing the plunger in the retracted, or non-inserted (in the mold) position;

FIG. 9 is a side view of the male mold plunger and piston assembly of the present invention showing the plunger in the extended or inserted position, similar to the position it would be in when the plunger was inserted into a female mold;

FIG. 12 is a bottom view of the second coupling member of the present invention, which second coupling member comprises the coupling member to which the plunger is attached;

FIG. 13 is a side view of the second coupling member shown in FIG. 18;

IV. DETAILED DESCRIPTION OF PREFERRED EMBODIMENT

Figure 1:
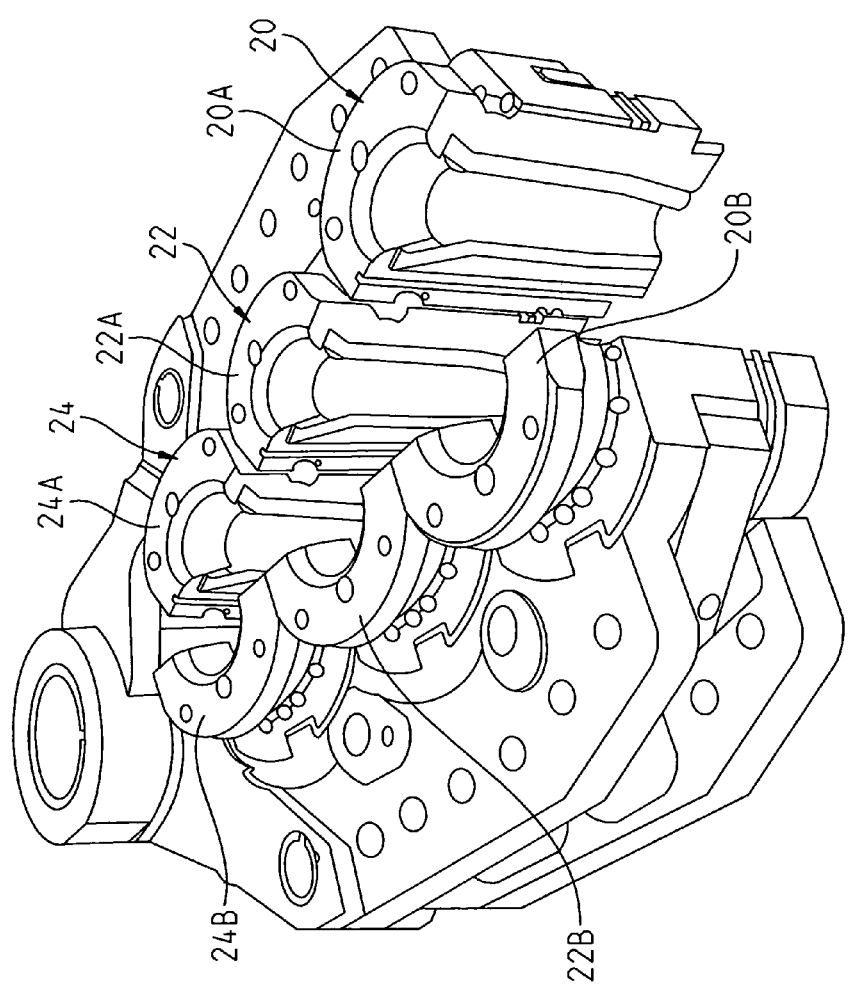
FIG. 1 is a perspective view of a three cavity female mold array of the type, for which the present invention is intended.
Figure 1A:
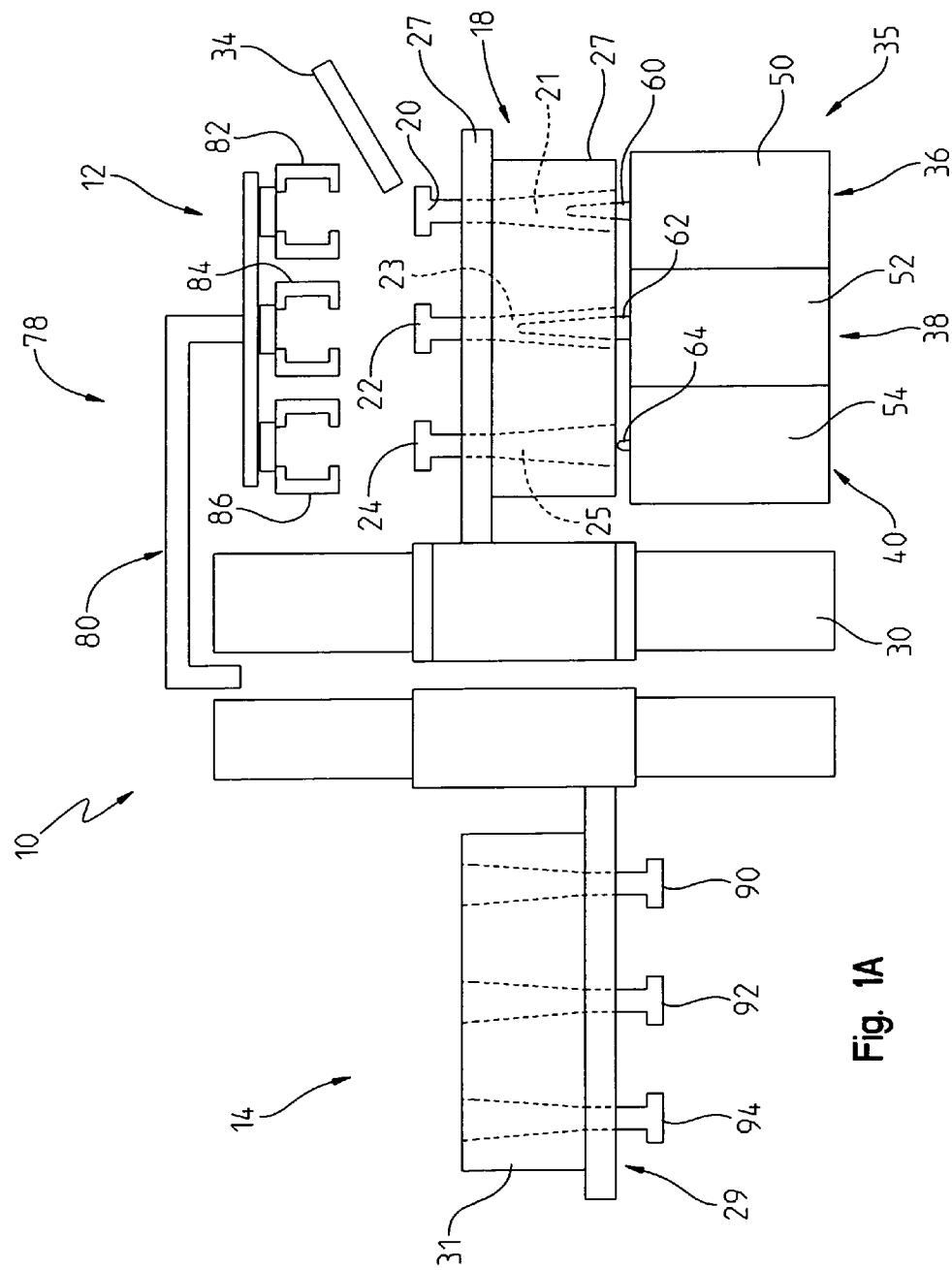
FIG. 1A is a side, schematic view of a molding machine with which the present invention is useable.

A molding station 10 of glass bottle molding machine is shown in the drawings. Turning now to FIG. 1A, the molding station 10 is schematically represented as having a first stage 12 and a second stage 14. The mold members 20 22, 24, 90, 92, 94 within the first 12 and second 14 stage are movable with respect to each other, so that the molds 20 22, 24 of the first stage 12 can be moved over to the second stage 14, and vice-versa.

As discussed above, the molding machine of mold station 10 is a press and blow type molding machine, wherein molten glass is inserted into the female cavities of the molds 20 22, 24 in the first stage, through trough 34 that carries the molten glass from its heating oven (not shown) to the female members 20, 22, 24.

Once the molten glass falls under gravity downwardly into the mold, it becomes characterized as a "gob". The plungers 60, 62, 64 of the male mold assemblies 36, 38, 40, are moved upwardly into the female molds to form a cavity within the gob of glass contained within the female mold. This glass gob that now contains a hollow interior is known as the parison.

The first female mold assembly 18 is then moved to the second stage, where it is inverted. Compressed air is then blown through the opening end formed by the male plunger member 60, 62, 64 to blow the glass of the parison against the walls of the female mold members 20, 22, 24 to form the parison into a bottle having an appropriate shape defined by the interior surface of the female mold cavity, e.g. 20, 22, 24.

The first female mold assembly 18 includes a first female mold cavity 20, a second female mold cavity 22, and a third female mold cavity 24. As such, the first female mold member 18 can properly be referred to as a three cavity mold, designating that three bottles will be produced in a single cycle of the female mold assembly 18. These three bottles include a first bottle that will emerge from the first female mold cavity 20, a second bottle that will emerge from the second female mold cavity 22, and a third bottle that will emerge from the third female mold cavity 24.

Each of the first, second and third female mold cavities 20, 22, 24 are two-part structures that are capable of moving from a "bottle release" position wherein the first 20A, 22A, 24A and second 20B, 22B, 24B halves are separated, as shown in FIG. 1A, to a "bottle forming" position where the halves are sealingly engaged together. The two halves include the first and second halves 20A, 20B of the first mold cavity 20; the first and second halves 22A, 22B of the second mold cavity 22; and the first and second halves 24A, 24B of the third mold cavity 24. This split is necessary in order to enable the mold halves to separate to enable the bottles to be removed from the mold cavities 20, 22, 24 after their molding has been completed, and the bottles are formed.

Each of the first, second and third mold cavities, 20, 22, 24 includes a body/coupler member 21, 23, 25 respectively for coupling the first, second and third mold cavities 20, 22, 24 to the mold tool holder member 27. The second female mold cavity assembly 29 is positioned in the second stage 14 of the mold machine assembly 10. Additionally, three female mold cavities 90, 92, 94 are part of the second three-cavity female mold assembly 29, as is a second female mold cavity holder 31.

A trough or tube assembly 34 is provided for transporting molten glass from the furnace wherein the glass is heated above its plastic point to the interior of each of the first, second and third female mold cavities 20, 22, 24. Although the trough assembly 34 is shown schematically in FIG. 1A, it will be appreciated that significant care should be used in the design of the trough, due to the temperature of the molten glass contained therein to ensure that the molten glass is safely and securely transported to, and inserted into the cavities 20, 22, 24.

A male mold assembly 35 is disposed in an aligning relationship with the female mold assembly 18, so that the plunger members of the male mold assembly may be inserted axially into the interior of the female cavity members 20, 22, 24. The male mold assembly 35 includes a first male mold piston/plunger assembly 36, a second male mold piston/plunger assembly 38, and a third male mold piston/plunger assembly 40.

The first male mold piston/plunger assembly 36 includes a pneumatic cylinder 50. The first pneumatic cylinder 50 is provided for axially moving a piston member, such as piston 66 (shown in FIG. 3A). The piston 66 is axially moveable and includes a base or proximal end 67 and a top or distal end 69. The top or distal end 69 is the end to which the coupler of the present invention is attached, for coupling the plunger, such as plunger 60, to the piston 66.

In the prior art, the plunger is coupled to the piston through a set of male threads formed on the plunger base that are threadedly engaged with female threads formed on an interior surface of the piston, and in most cases, on an interior surface of an end body, which itself has male threads that are threadedly engaged with female threads formed in the interior surface of the piston. As there exist three male mold piston/plunger assemblies 36, 38, 40, there exist three pneumatic cylinders 50 52, 54, each of which contains its own piston and its own plunger 60, 62, 64. Although the pneumatic cylinders 50, 52, 54 can be designed to operate independently of each other, general practice is for the plungers to operate in unison.

A mold moving mechanism 78 is provided for moving the female cavities 20, 22, 24 from the first stage position 12, to the second stage position 14. In the illustrated molding machine, the mold moving mechanism 78 includes an arm member 30, that is coupled to the central column 30 of the mold moving machine. The arm member 80 includes a first gripping claw 82, a second gripping claw 84, and a third gripping claw 86, for grabbing, the first 20, second 22 and third 24 female cavity mold members. The gripping claws 82, 84, 86 grab the respective female cavity molds 20, 22, 24 and move them to the second stage 14, where they are inverted.

To increase production, a separate female mold assembly 29 including its own mold holder 31 is placed in the second stage, that can also be moved by the gripping claws 82, 84, 86 to the first stage when appropriate. As shown in the drawing, the second stage 14 mold member 29 includes a first female cavity member 90, a second female cavity member 92, and a third female cavity member 94.

As best shown in FIGS. 3A and 3B, the quick connect coupler 98 of the present invention includes a first coupler member 100 that is fixedly coupled to the piston 66, and a second coupler member 102 that is removably engagable with the first coupler member 100, and is also removably engagable with the plunger 60 for removably coupling the plunger 60 to the piston member 66. The quick connect coupler 98 provides a strong enough and permanent coupling so that when the plunger 60 is coupled to the piston 66, the male mold member can operate to move the piston 66, and plunger 60 axially within the interior of the female mold cavities, on a high speed and regular basis, without coming apart or breaking. Additionally, the coupling should be rigid enough so as to prevent relative movement between the piston 66 and the plunger 60 for such movement can cause imperfections and irregularities in the bottle produced.

Fasteners, such as first and second clips 106, 108 are generally C-shaped in cross section, and are provided for fastening together the second coupling member 102 to the plunger member 60. When the clips 106, 108 couple the plunger 60 to the second coupling member 102, the second coupling member 102 and plunger 60 are axially aligned so that they are disposed coaxially. The clips 106, 108 fasten the proximal end 112 of the plunger 60 to the distal end of the second coupling member 102. The plunger 60 also includes a distal portion 114, that is the portion that is inserted into the interior of the female cavity 20 for extending into the gob of glass to form the gob of glass in the female cavity into a parison.

The proximal end of the plunger 60 comprises a washer-shaped, enlarged diameter flange 118 disposed at the proximal end 119 end portion 118, that includes an axially outwardly facing shelf portion 120, and an axially inwardly (proximally) facing shelf surface portion 121. The flange 118 also includes an axially extending, radially facing annular surface 117. A generally cylindrical base portion 122 extends upwardly (distally) from the end portion 119, and terminates in the frusto-conical gob-insertable plunger member 124. Plunger member 124 distally terminates in a hemispherically shaped distal end 126.

The particular shape of the distal portion 114 of the plunger can vary depending upon the type of bottle that is being molded. The plunger member 114 shown in FIG. 3A is intended for use in connection with a small-mouthed bottle, such as a beer bottle.

Plungers having a variety of different shaped plunger members are shown in FIGS. 17-20, that show plungers 60A, 60B, 60C and 60D. It will be noted that plungers 60A, 60B and 60C have a wide base portion, and are intended for use with wide mouth jars, such as pickle jars, mayonnaise jars, jelly jars and the like. In contrast, plunger member 60D (FIG. 20) is relatively elongated and small-diametered, and has a very slight taper between its proximal end and its distal end, thus suggesting its suitability for a tall, small mouthed bottle, such as a "long neck" type beer bottle.

Figure 2:
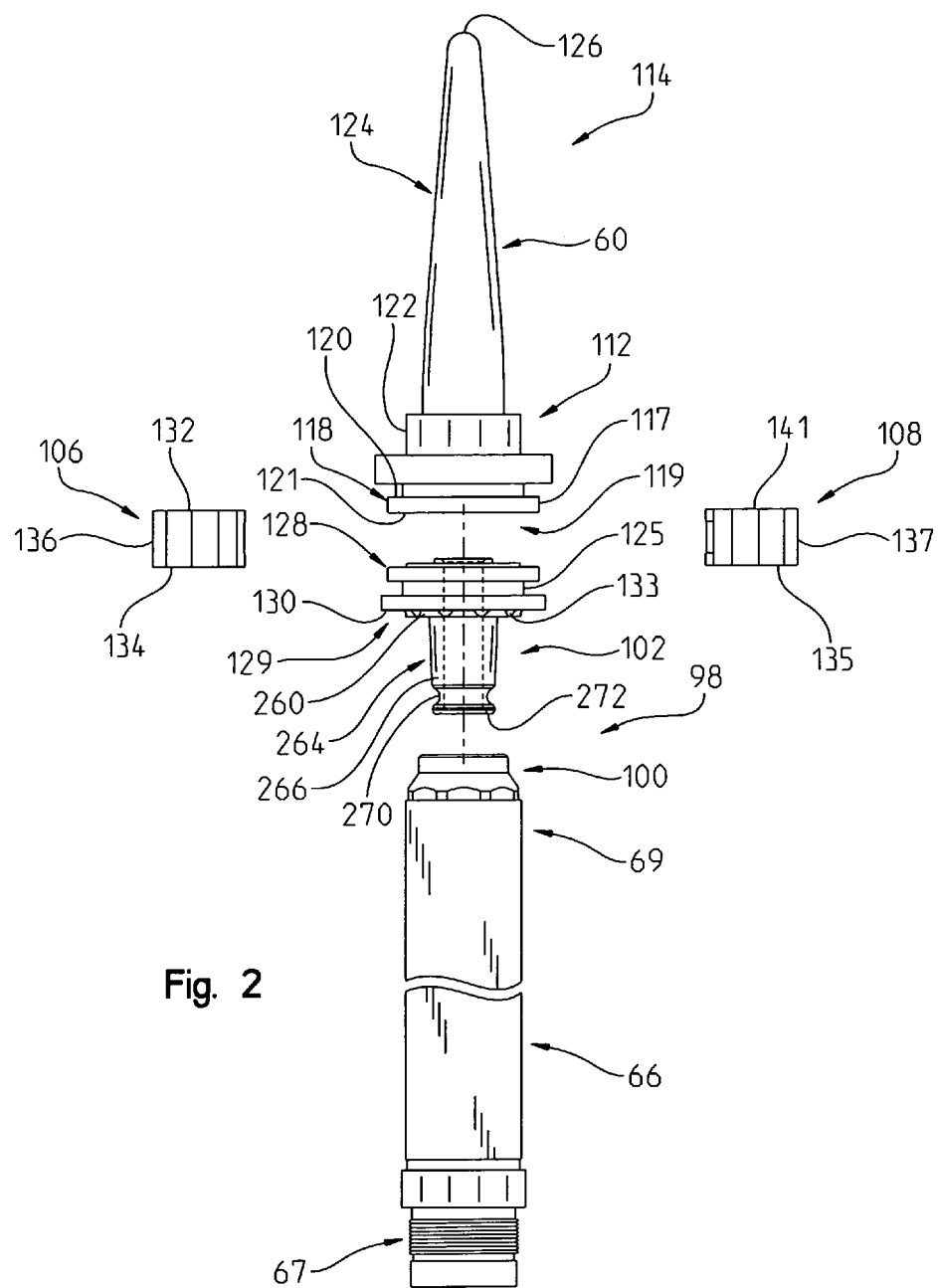
FIG. 2 is an exploded view of a plunger, quick connect mechanism, and piston components of a plunger of the present invention.
Figure 3:
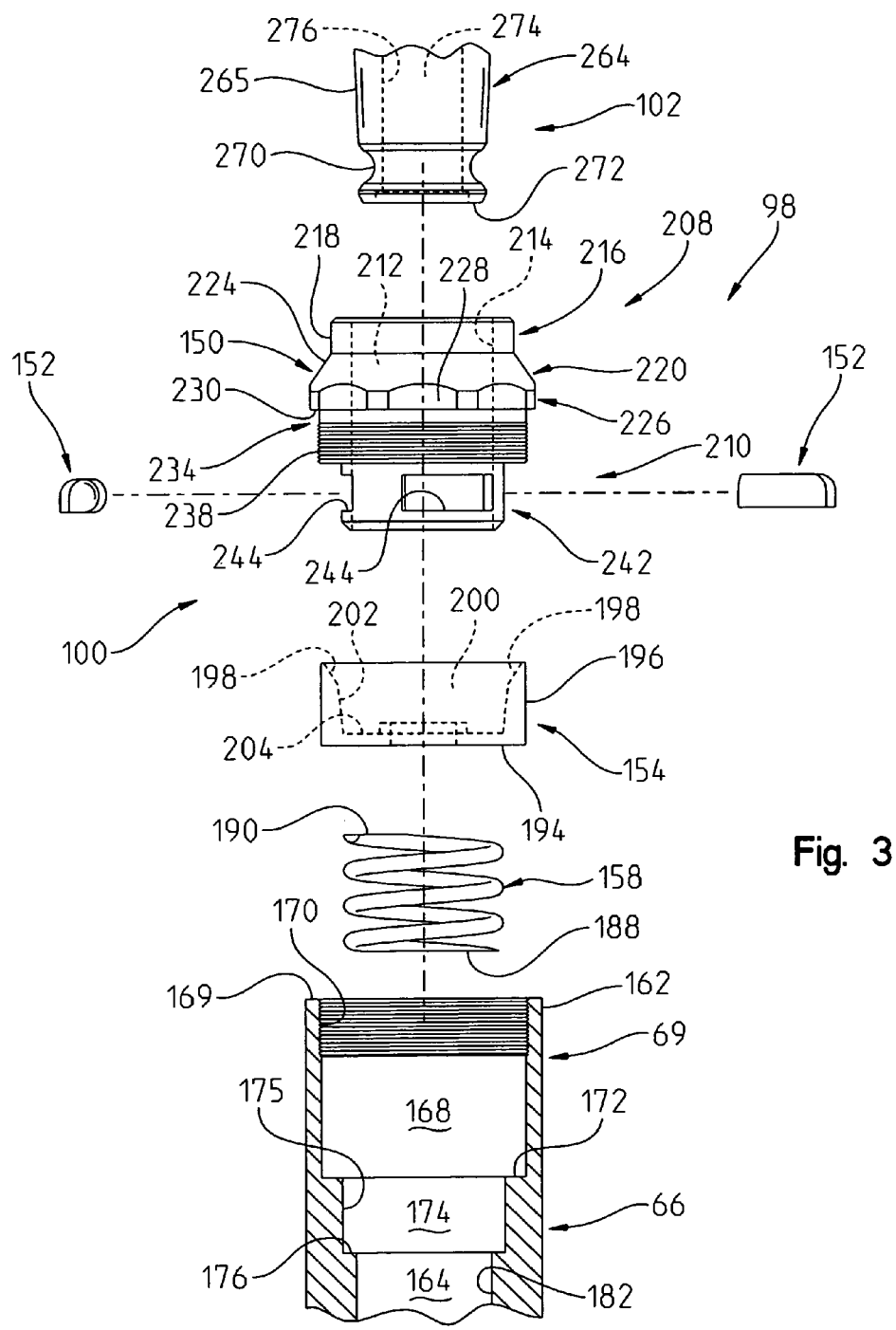
FIG. 3 is an exploded view of the quick release coupler of the present invention.

Returning back to FIGS. 2 and 3, it will be noted that the second coupler 102 also includes a washer-shaped, enlarged diameter flange 128 disposed at the distal end portion. Flange 128 has an axially inwardly (proximally) facing surface 130, an axially outwardly (distally) facing surface 125, and a radially outwardly facing annular edge. As best shown in FIGS. 2-4, the C-shaped clips 106, 108 each include a first radially extending leg 132, 141; a second radially extending leg 134, 135; and a first axially extending leg 136 and 137. The first radially extending legs 132, 141 are sized and positioned for engaging the axially outwardly facing surface 120, of the flange 118 of the plunger member 60. Similarly, the second radially extending legs 134, 135 are sized and positioned for engaging the axially proximally facing surface 130, of the flange member 128 of the second coupler member 102.

The clip members 106, 108 are designed to be press-fit into engagement to engage the plunger member 60 to the second coupler member 102, and to be pried off of their engagement with the various surfaces 120, 130, to separate the coupler member from the plunger member 60. When the clip member 106, 108 couple the plunger 60, the second coupler member 102, the proximally facing surface 121 of the flange 118 is placed against the flange 128 to rest upon the distally facing surface 125 of the second coupler member 102 flange 128.

As best shown in FIG. 3, the primary components of the first coupler member 100 include a main, socket-containing body 150; a plurality (e.g. three) of radially movable grip members 152 (see also FIGS. 5A and 5B); a non-threaded grip-engaging member, such as axially movable cup receiver 154 that receives the proximal end of the socket body 150; and a biasing spring 158 that engages the underside surface 194 of the axially movable cup 154 and is tensioned to exert a biasing force in a generally distal direction, so as to normally urge the receiving cup 154 in a distal direction, toward the second coupling member 102.

The axially movable cup is movable between a grip engaging position (e.g. FIG. 4) wherein the grip engaging member 154 wall 196 holds the grip member 152 in the second coupler engaging position, wherein the grip member 152 is inserted within groove 278, and a grip 152 releasing position wherein the wall 196 of the axially moving cup 154 moves from a position radially outwardly of the grip 152, to a position axially offset from the grip 152, to permit the grip member to move out of the groove 270 and into the second coupler 102 release position.

The distal end 69 of the piston 66 includes a cylindrical outer surface 162 and an interior passageway 164. The distal end of the interior passageway 164 comprises an enlarged diameter end portion 168 having a threaded interior surface 170. The female threads 170 are provided for receiving the male threads 238 of the main socket body 150. The enlarged diameter end portion 168 terminates in a radially inwardly extending, axially distally facing shelf 169 that comprises a cup seat 172, that is sized to receive the underside surface 194 of the axially movable cup 154.

Moving proximally inwardly from the enlarged diameter distal end portion 168, is the spring receiving portion 174 having an intermediately sized diameter. Intermediate diameter spring receiving portion 174 includes a radially inwardly facing, axially extending cylindrical wall 175 that terminates at its proximal end, in a radially inwardly extending axially distally facing shelf 176. Shelf 176 serves a spring seat 176 for the distal end 190 of spring 158. A reduced diameter passageway 164 has its distal end at the radially extending shelf 176, and its proximal end at the proximal end 67 of the piston 66.

Spring 158 includes a proximal end 188, that is sized and positioned for being received on the shelf 176. The radial diameter of the spring 158 is sized to be received within the intermediate diameter spring receiving portion 174 in a manner wherein the relatively small spacing between the spring 148 and the cylindrical wall 175 helps to keep the spring properly oriented with its axis being coaxial with the first and second couplers 100, 102.

A spring 158 includes a proximal end 188 for being received on the spring receiving shelf 176 and a distal end 190 that has at its seat the underside surface 194 of the receiver cup 154. The cup 154 includes a radially extending, underside surface 194 that serves as a seat for the distal end of spring 158, and a cylindrical side wall surface 196 that terminates at the distal end of the receiver cup 154 in a chamfered or beveled upper lip 198. The cup 154 also includes a hollow interior 200 that is defined by a generally cylindrical interior side wall 202, and a generally planar bottom release tool receiving interior surface 204.

The main socket body 150 includes a distal portion 208 that is generally disposed exteriorly of the piston 66, and a proximal portion 210 that is disposed generally interiorly of the piston 66, within the enlarged diameter end portion 168 of the interior passageway 164 of the piston 66. The main socket body 150 also includes a generally constant diameter axially extending passageway 212 that extends through each of the distal 208 and proximal 210 portions between the distal end and the proximal end of the main socket body 150. The axially extending passageway 212 is defined by a generally cylindrical interior wall 214 that terminates at its distal end in a distal lip portion 216. The distal lip portion 216 includes a generally cylindrical outer surface 218.

A transition portion 220 is disposed proximally of the distal lip 216. The transition portion 220 is disposed exteriorly of the piston 66, and includes a frustoconical surface 224, wherein the diameter of the surface 224 increases as one moves in a proximal direction. The proximal terminus of the frustoconical surface 224 comprises the beginning of the tool engagable surface 226. The tool engagable surface 226 is segmented, annular and includes a plurality of flats 228, that can be engaged by a socket wrench, crescent wrench, open-end wrench or the like, to facilitate engagement of the socket body 98 to, and disengagement of the socket body 98 from the piston 66.

Preferably, the tool engagable surface 226 includes eight such flats, to form an octagon-shape in cross section, and includes a radially extending surface 230 that is sized and positioned for engaging the axially distally outwardly facing surface 169 of the piston 66.

Figure 5A:
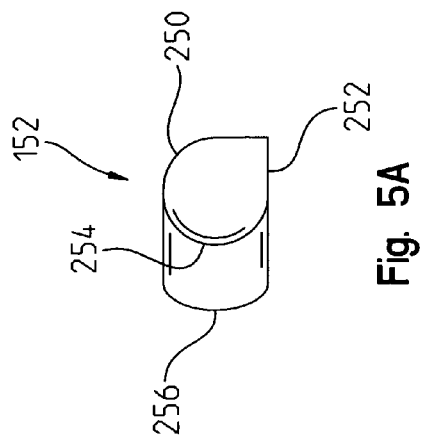
FIG. 5A is a perspective view of the slidable grip members of the present invention.
Figure 5B:
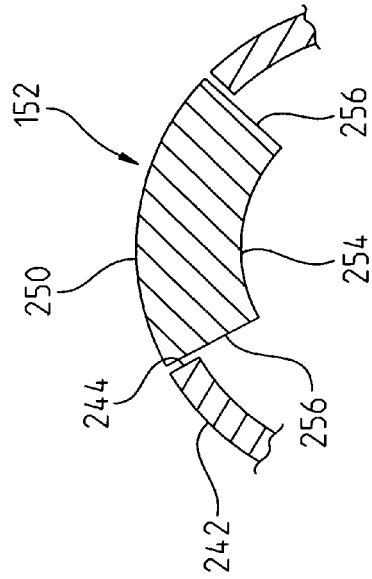
FIG. 5B is a sectional view of the grip members inserted within the first coupler member, and in particular within an aperture of the first coupler member of the coupler of the present invention.

An axially extending, cylindrical male threaded piston engaging surface 234 extends proximally from the radially extending lip engaging surface. The threaded piston engaging surface 234 includes male threads 238, for threadedly engaging the female threads 170 of the piston 66, for removably coupling the socket body 150 and the piston 66. Disposed proximally of the male threads 238 is a reduced diameter cylindrical grip-receiving portion 242, that generally is not threaded. Grip receiving portion 233 includes a plurality of apertures 244 (e.g. three apertures 244) for receiving a plurality of grips 152. The grips 152 are sized and configured for being received in the apertures 244, as best shown in FIGS. 5A and 5B.

Figure 5:
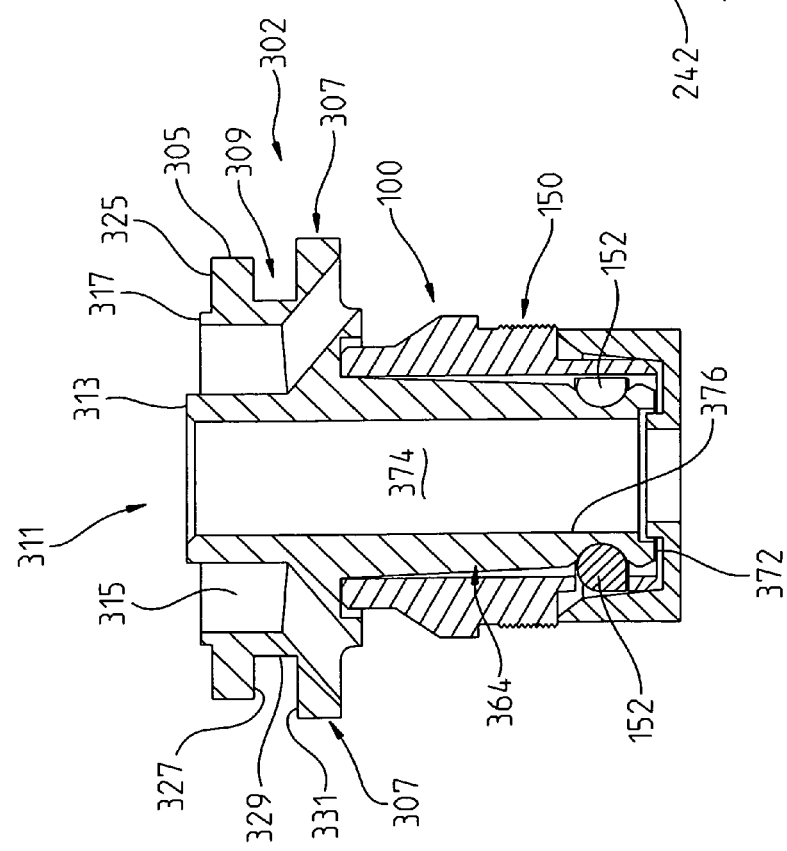
FIG. 5 is a side view of the quick release coupler mechanism of the present invention, similar to FIG. 4, except showing the coupler removed from the piston.
Figures 6, 6A:
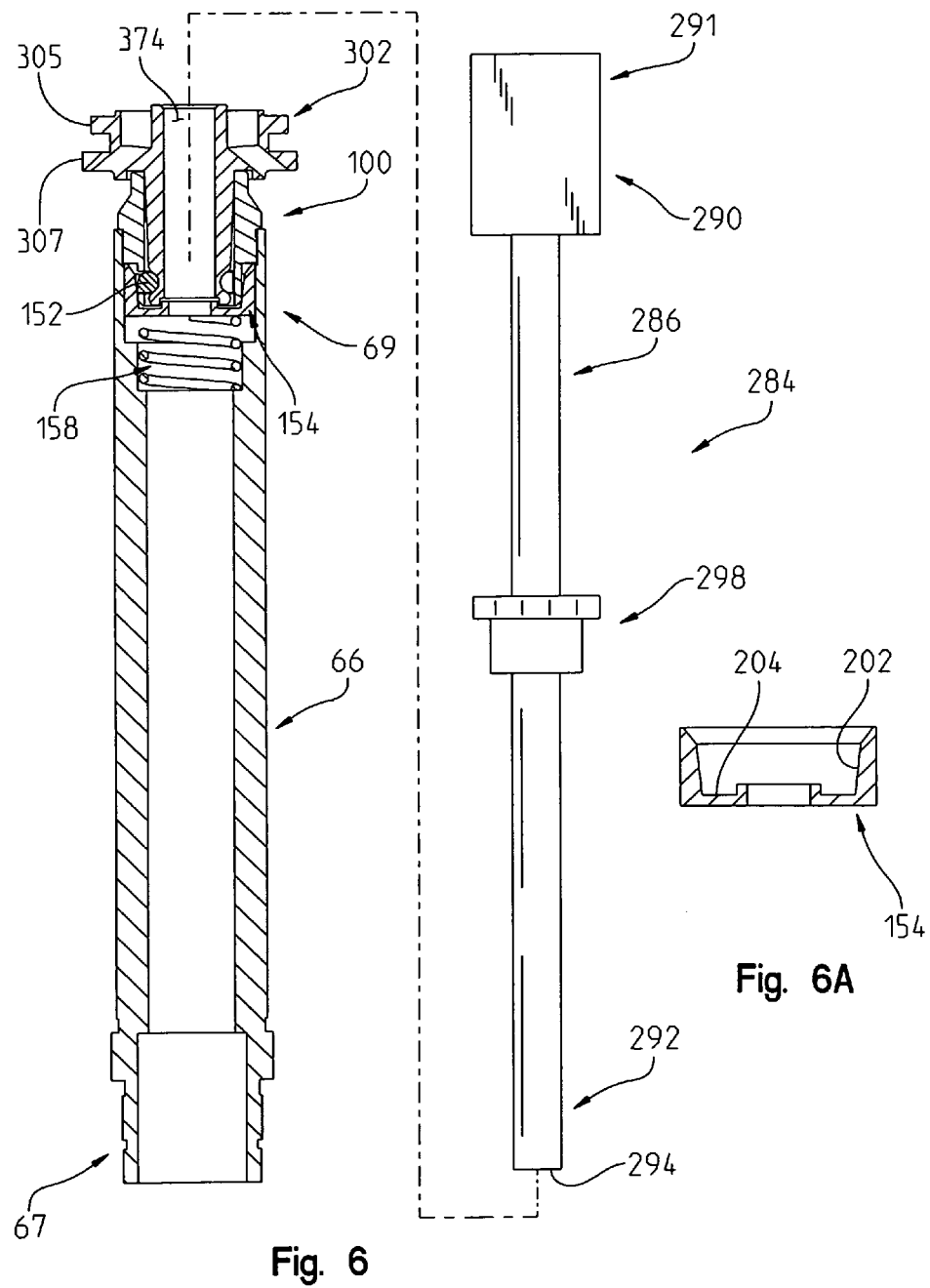
FIG. 6 is a side, sectional view of the piston containing the quick release coupler of the present invention, along with the release tool, showing the quick coupler in the engaged position.
FIG. 6A is a side, sectional view of the grip member engaging slidable retaining cup of the present invention.
Figure 7:
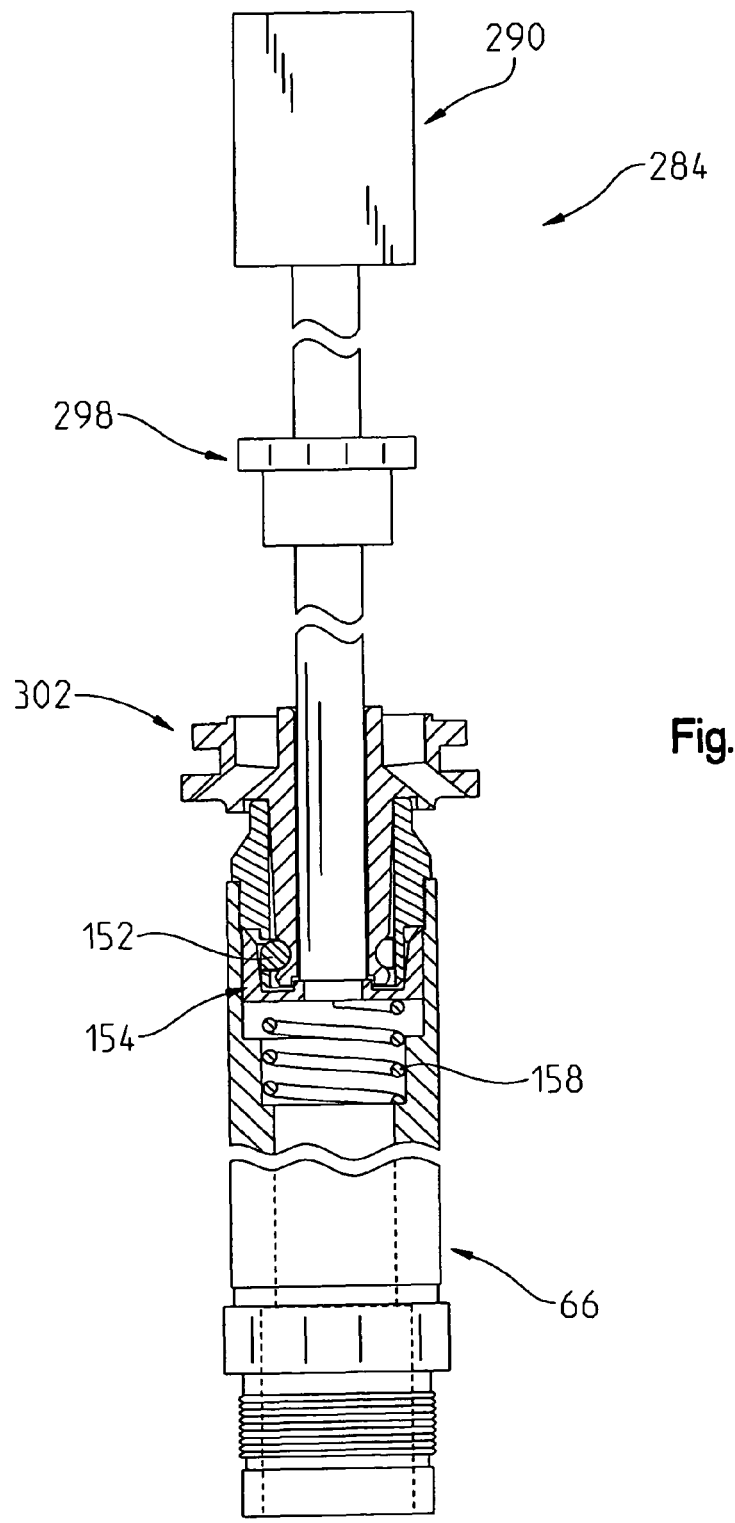
FIG. 7 is a side sectional view, similar to FIG. 6, except that it shows the release tool engaged with the quick release coupler housed within the piston to move the quick release coupler into the release position.
Figure 10:
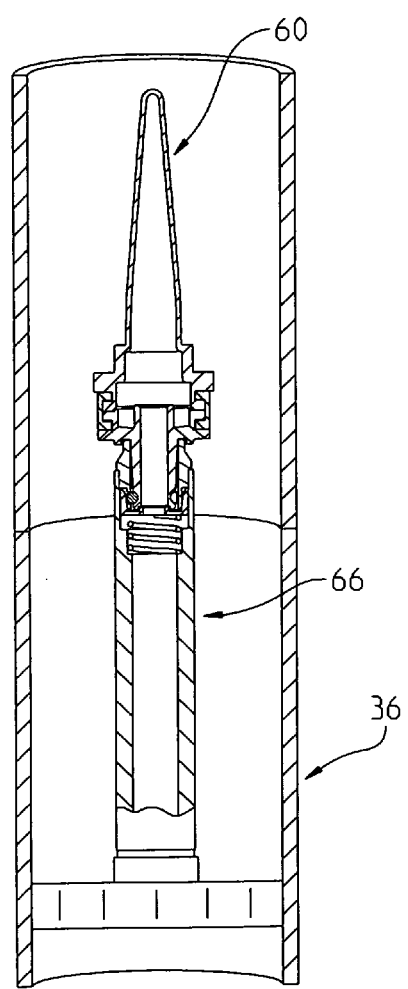
FIG. 10 is a sectional view taken along lines 10-10 of FIG. 8.
Figure 11:
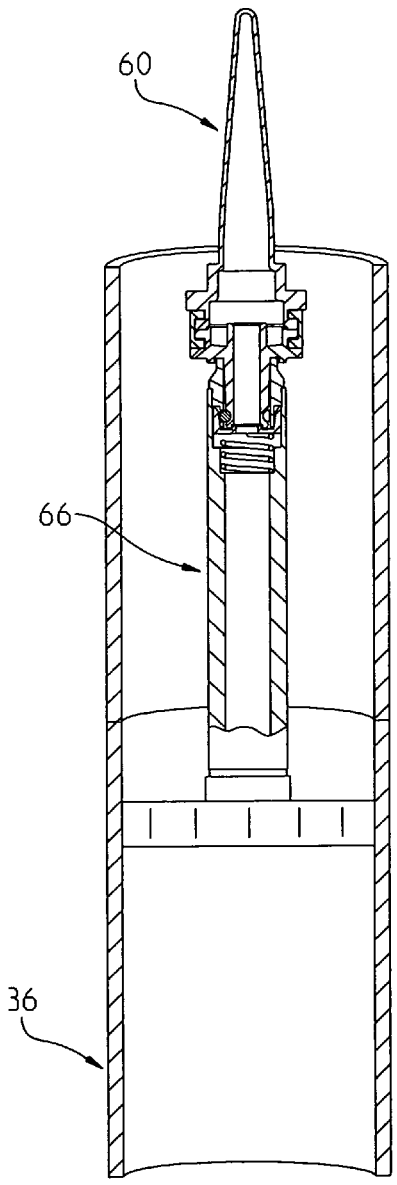
FIG. 11 is a sectional view taken along lines 11-11 of FIG. 9.

The grips 152 include a "quarter-round" shaped radially outer surface 250, and a planar bottom surface 252. As best shown in FIG. 5A, the grips 152 also include a hemi-cylindrical radially interior surface 254, and angled planar side surfaces 256. The angled side surfaces 256 are sized and positioned to prevent the grip 152 from moving interiorly completely through the aperture 244 and thereby becoming dislodged from the aperture 244. This cooperation between the angled side surfaces 256 of the grip 152, and the side walls of the aperture 244, and the interior cylindrical wall surface 202 of the cup 154, maintains the grips 152 in a position wherein they can move radially within the aperture 244 between their radially inwardly disposed second coupler engaging position as shown in FIG. 6, and their relatively radially outwardly disposed second coupler release position as shown in FIG. 7, while preventing the grips 152 moving radially inward far enough to become dislodged from the apertures 244. FIG. 5 also schematically shows the grips 152 in their radially inwardly disposed coupler engaging position.

As best shown in FIG. 2, a "first design" second coupler 102 is shown that designed to be removably coupled to the first coupler 100. The second coupler 102 includes a distally disposed base portion 260 that is disposed just proximally of the washer-shaped end member flange 128. The base portion 260 transitions into a frusto-conical, axially extending socket-engaging member 264, that is insertable into the socket interior 212 (FIG. 3) of the socket body 150. The socket-engaging member 264 has a frusto-conical exterior surface 265 that includes an annular grip receiving recessed groove 270, that is disposed adjacent to the proximal end 272 of the frusto-conical exterior surface 266. The second coupler 256 includes an axially extending interior passageway 274 that has a generally cylindrical wall 276, so that the interior passageway 274 has a generally constant diameter throughout its length. The axially extending interior passageway 274 is open at each of its proximal and distal ends.

Figure 14:
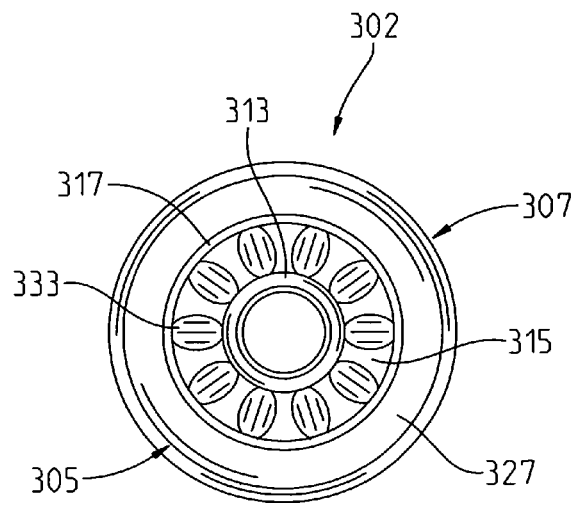
FIG. 14 is a top view of the second coupling member shown in FIG. 12.
Figure 15:
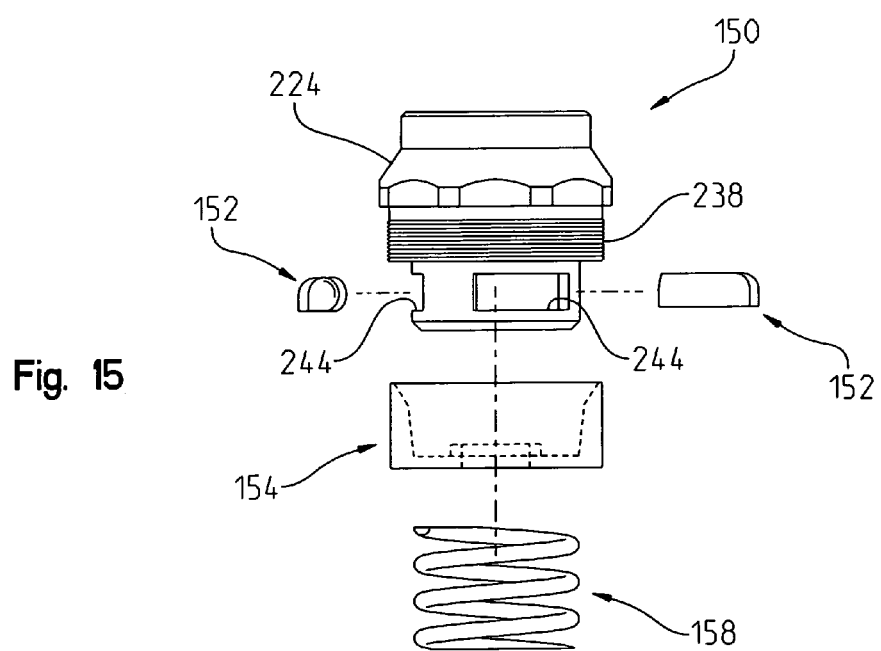
FIG. 15 is an exploded view of the first coupler member receiver cup and spring of the present invention.
Figure 16:
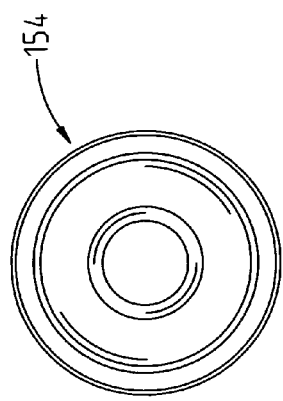
FIG. 16 is a top view of a receiver cup of the present invention.
Figure 20:
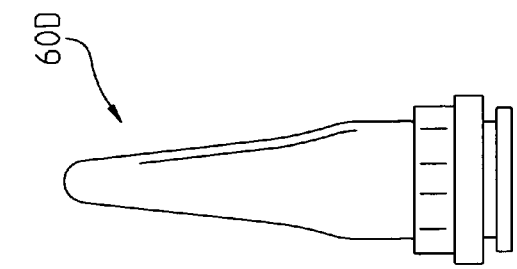
FIGS. 17-20 are side views of alternate embodiment plungers of the type that can be used with the present invention.
Figure 19:
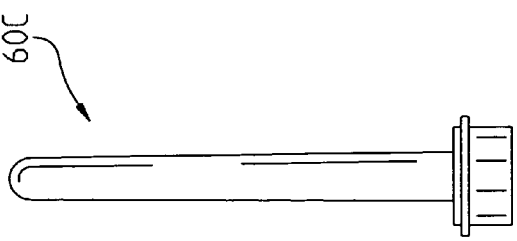
Figure 18:
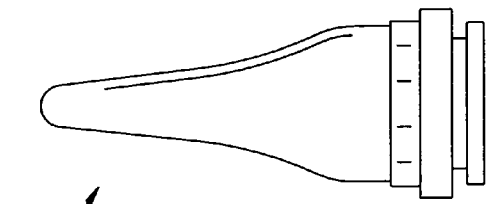
Figure 17:
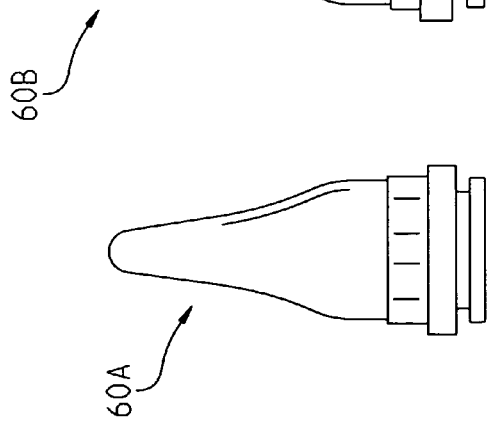

A second design of the second coupler 302 is shown in FIGS. 4, 5, 6, 7, 12 and 13, and is also designed to be removably coupled to the first coupler 100. The second design of the second coupler 302 includes a base portion 360 that includes a first, relatively distally disposed first (end) flange 305, and a more proximally disposed second flange 307. The second flange 307 has a greater diameter than the first flange 305, and a recessed annular channel 309 extends between the first 305 and second 307 flanges. The radially extending, axially distally facing distal end 311 of the second coupler 302 includes a central rim 313 that defines the distal end of the central passageway 374. A recessed annular channel 315 is disposed radially outwardly of central rim 313, and is in communication with a plurality of air vents 333 (FIG. 14) that extend in a generally oblique angle to the axial axis of the coupler, and generally through the second flange 307.

A raised rim 317 surrounds the annular channel and is disposed radially inwardly of the radially outwardly disposed, axially distally facing end surface outer portion 325. End surface outer portion 325 is the surface on second design second coupler 302 that is engaged by the end surface 121 of the piston. The annular radially outwardly opening channel 309 is defined by a washer-like axially proximally facing surface 327 of the first flange 305, and axially extending cylindrical surface 329, and a generally washer-like radially extending axially distally facing surface 331 that is formed as a part of second flange 307. The channel 309 is sized and positioned for receiving the second legs 134, 135 of the C-shaped clips 106, 108 respectively.

The upper surface 339 of the second flange includes openings for the vents 333.

The base portion 360 which includes first 305 and second flange 307 and includes a raised annular axially proximally facing ring 341 disposed interiorly of vents 333. An annular recess 343 extends between ring 341 and the frust-conical socket engaging stem 364 (FIG. 12). The frusto-conical upstanding, centrally disposed socket engaging stem 364 is disposed interiorly of the recess 343. The socket-engaging portion 364 is insertable into the socket interior 312 of the socket body 150. The socket-engaging portion 364 has a frusto-conical exterior surface 366 that includes an annular grip receiving groove 370, that is disposed adjacent to the proximal end 372 of the frusto-conical exterior surface 366. The second coupler 302 includes an axially extending interior passageway 374 that has a generally cylindrical wall 376, so that the interior passageway 374 has a generally constant diameter throughout its length. The axially extending interior passageway 374 is open at each of its proximal and distal ends.

As best shown in FIG. 5, the annular, radially extending, axially proximally facing surface 371 of the second coupler 302 is then positioned to engage the radially extending distally facing surface 204 of the receiving cup 154 (FIG. 3) to move the receiving cup in an axial proximal direction so that the receiving cup is moved to a position wherein the interior side wall 202 of the receiver cup 154 is no longer disposed radially outwardly of, and axially co-extensively with the gripping members 152. When the gripping members 152 are axially offset, and therefore not disposed co-extensively with and radially outwardly of the wall of the receiving cup, the gripping members 152 can move radially axially to thereby release them from their entrapment within groove 370, to thereby permit the stem 264 of second coupler 302 to be moved axially distally, and thereby removed from its engagement with the socket member 150, thereby permitting the plunger 66 to be removed from the piston 60.

As best shown in FIGS. 6 and 7, a coupler engagement tool 284 includes a cylindrical shaft 286, having a handle end 290. Handle end 290 includes a generally enlarged diameter cylindrical handle member 291. The coupler engagement tool 284 also includes a coupler engaging portion 292 that includes a radially extending cap engaging surface 294. A mid-shaft grip member 298 is disposed about half way between the radially extending cap engaging surface 294 and the handle 290. The mid-shaft grip member 298 is provided for giving the user another place to grip the coupler engaging tool to facilitate its axial movement.

The operation of the device can be best understood with reference to FIGS. 6 and 7. FIG. 6 shows the device in its normally coupler-engaged position, wherein the grip members 152 are positioned radially inwardly, so that they are firmly inserted within the annular groove 370 of the second coupler member 302. The grip members 152 are locked in their position because they are disposed between the cylindrical interior wall 202 of the cap member 154, and are inserted in the apertures 244 of first coupler body 150. Radially outwardly directed movement of the grip members 152 is prevented because of the relative radial proximity of the interior cylindrical wall 202 of the end cup member 154 and the axially co-extensive positioning of the wall end grip members 202 forces the grip members 152 radially inwardly so that the grip members become firmly seated in the groove 370. Additionally, the cylindrical wall 200 prevents the gripping member 152 from moving radially outwardly to release the stem 364, unless the receiving cup 154 is moved axially proximally, so that the cylindrical wall 202 positioned radially outwardly of the gripping members 152, but rather, is axially offset from the gripping members 152.

In FIG. 7, it will be noted that the radially extending proximal end 294 of the coupler engagement tool 284 has engaged to the axially distally facing upper interior surface 204 of the cup member 154, to push the cup member 154 axially proximally, to thereby compress the spring 158. The axially proximally directed force that one must exert on the coupler engagement tool 284 must be sufficient to overcome the axially distally biased force of the spring 158. The exertion of an axially proximally directed force on cup 154 surface 204 moves the cup member 154 axially proximally to a point wherein the chamfered lips 198 of the cup member 154 are placed below the grip members 152. This enables the grip members 152 to move radially outwardly a sufficient distance so that the coupler member 102 can be moved axially distally past the gripping members 152. This coupler disengaged position is shown in FIG. 7.

Once the coupler member 102 is moved axially distally, so that the second coupler member 102 is withdrawn from its engagement with the first coupler member 100, the coupling engagement tool 284 is moved axially distally from passageway 374. This axially distal movement of the coupler engagement tool, enables the cup member 154 to move, under the influence of the spring 154 in an axially distal direction. This axially distal movement of the cup member 154 causes the grip members 152 to be moved radially inwardly, under the influence of the chamfered lip surface 198. When the spring 154 has reached its fully extended position, or otherwise, the movement of the cup member 154 is limited by the underside surface 230, of the frusto-conical portion of the socket body 150, the grip members 152 will be positioned radially inwardly, in a position similar to the position they occupy when the second coupler is engaged to the first coupler and the grip members 152 are in the coupler engaged position.

A second alternate embodiment quick release coupler 400 is shown in FIGS. 21-26. As with the couplers described above, quick connect coupler assembly 400 is provided for use with a glass container molding machine, for coupling a molding member, such as plunger 399, to a mold member mover, such as a piston 397. The quick connect coupler 400 includes a first coupler member 402 that is configured to be coupled to one of the piston 397 and plunger 399. In the instant embodiment shown in the drawings, the first coupler 402 is designed for being coupled to the piston 397, and the second coupler member 404 is designed to be coupled to the plunger 399.

A primary difference between the alternate embodiment coupler 400 shown in FIGS. 21-26, and the embodiment shown in the foregoing figures, is that the coupler body 414 of coupler 400 comprises a two-piece body that includes a first, relatively proximally disposed body element 416, and a second, relatively distally disposed body element 418. The Applicant has found that the second embodiment coupler 400 has an advantage over the first alternate embodiment coupler 402 has the potential to have a longer useful life since the detachable second body element 418 does a better job of absorbing impacts, thus saving wear and tear on the quick change part of the coupler.

Prior to the insertion of the coupler 400, and in particular, the first coupler member 402 in the piston 397, the first and second body elements 416, 418 are fixedly coupled together through a bayonet type connector system that connects the first 416 and second 418 body elements of the first connector body member 414 together.

As best shown in FIGS. 21-26, the primary components of the first coupler member 402 include a main, socket-containing body that includes the first proximally disposed body element 416, and the second, distally disposed body element 418. The coupler 402 includes a plurality (e.g. three) of radially movable grip members 422 that are virtually identical to grip member 152; a non-threaded grip-engaging member, such as axially movable cup receiver 424 that receives the proximal end 428 of the socket body first element 416; and a biasing spring 430 that engages the underside surface 434 of the axially movable cup 424 and is tensioned to exert a biasing force in a generally distal direction, so as to normally urge the receiving cup 424 in a distal direction, toward the second coupling member 404.

The axially movable receiver cup 424 is movable between a grip engaging position wherein the wall 436 of the grip engaging member receiver cup 424 holds the grip members 422 in the second coupler 404 engaging position, wherein the grip member 422 is inserted within groove 440, and a grip 422 releasing position wherein the wall 436 of the axially moving cup 424 moves from a position radially outwardly of the grip 422, to a position axially offset from the grip 422, to permit the grip member 422 to move out of the groove 440 and into the second coupler 404 release position.

A spring 430 includes a proximal end 444 for being received on the spring receiving shelf 446 and a distal end 448 that has at its seat the underside surface 434 of the receiver cup 424. The cup 424 includes a radially extending, underside surface 434 that serves as a seat for the distal end of spring 430, and a cylindrical side wall surface 436 that terminates at the distal end of the side wall 436 in a chamfered or beveled upper lip 450. The cup 424 also includes a hollow interior that is defined by a generally cylindrical interior side wall 456, and a generally planar bottom release tool 284 receiving interior surface 458.

The first body element 416 includes a distal portion 460 that is generally disposed exteriorly of the piston, and a proximal portion 462 that is disposed generally interiorly of the piston, with a flat-containing waist flange 464 serving as the proximal limit of the distal portion 460. The first body element 416 also includes a generally constant diameter axially extending passageway 468 that extends through each of the distal 460 and proximal 462 portions between the distal end 470 and the proximal end 472 of the first body element 416. The axially extending passageway 468 is defined by a generally cylindrical interior wall 476 that terminates at its distal end in a distal lip portion 470.

Figure 23:
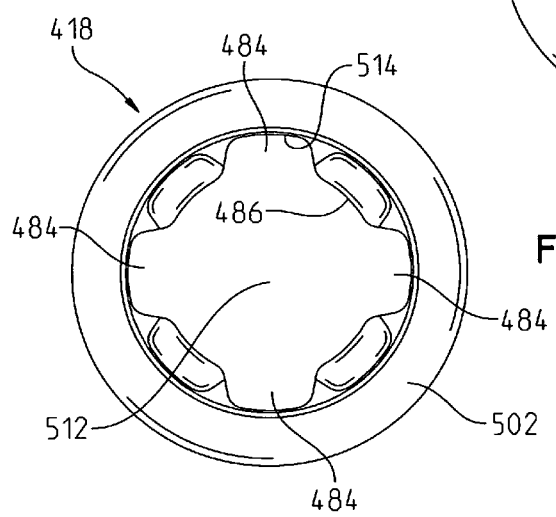
FIG. 23 is a distal end view of a second body element of the first coupler member of the embodiment shown in FIG. 21.
Figure 24:
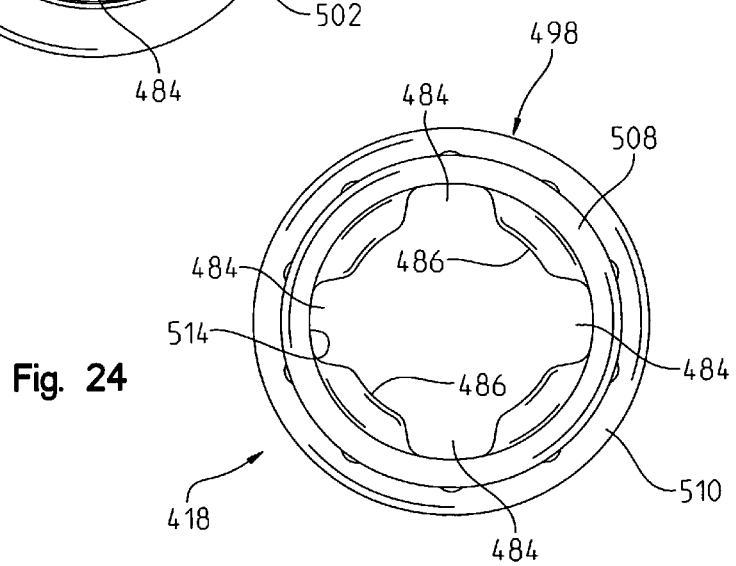
FIG. 24 is a proximal end view of the second body element of the second coupler body member.
Figure 25:
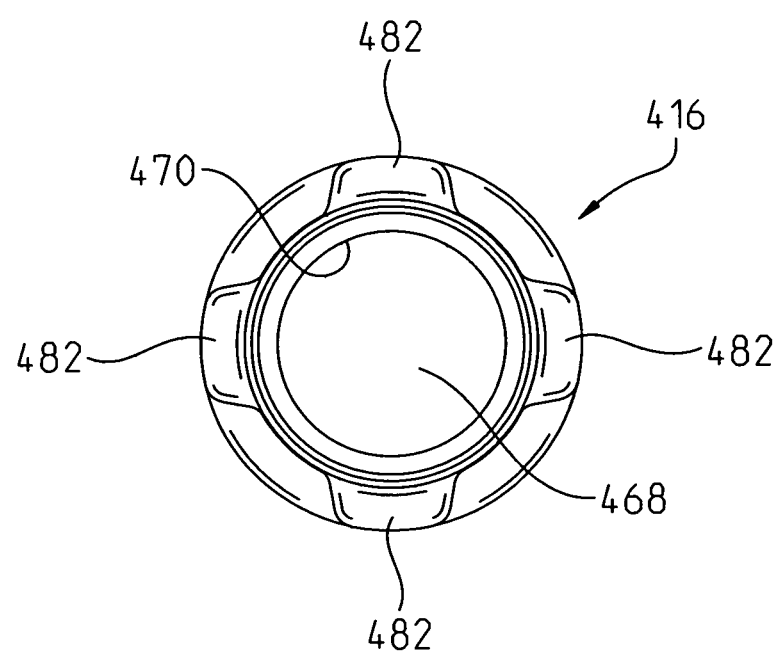
FIG. 25 is a distal end view of the second body element of the body member of the first coupler member.

The distal lip portion 470 includes a generally cylindrical outer surface 478 that includes an array of four equally-spaced, radially outwardly extending lugs 482 that comprise one-half of the bayonet connector that includes slots 484 formed in a radially inwardly extending flange 486 in the second body element 418 (FIGS. 23 and 24). A washer-type spring 488 maintains an axially directed pressure on the bayonet components 482, 484, to press the distal surface of flange 486 against the axially, proximally facing surface of lugs 482.

An axially extending, cylindrical male threaded piston engaging surface 490 extends proximally from the waist flange 464. The threaded piston engaging surface 490 includes male threads 492, for threadedly engaging the female threads of the piston 397, for removably coupling the socket body first element 416 and the piston 397. Disposed proximally of the male threads 492 is a reduced diameter cylindrical grip-receiving portion 493, that generally is not threaded. Grip receiving portion 493 includes a plurality of apertures 494 (e.g. three apertures 494) for receiving a plurality of grips 422. The grips 422 are sized and configured for being received in the apertures 494.

The grips 422 include a "quarter-round" shaped radially outer surface and are generally identical to grips 152. The angled side surfaces of the grips 422 are sized and positioned to prevent the grips 422 from moving interiorly completely through the aperture 494 and thereby becoming dislodged from the aperture 494.

As best shown in FIGS. 21-26, the primary components of the first coupler member 402 include a main, socket-containing body that includes the first proximally disposed body element 416, and the second, distally disposed body element 418. The coupler 402 includes a plurality (e.g. three) of radially movable grip members 422 that are virtually identical to grip member 152; a non-threaded grip-engaging member, such as axially movable cup receiver 424 that receives the proximal end 428 of the socket body first element; and a biasing spring 430 that engages the underside surface 434 of the axially movable cup 424 and is tensioned to exert a biasing force in a generally distal direction, so as to normally urge the receiving cup 424 in a distal direction, toward the second coupling member 404.

The axially movable receiver cup is movable between a grip engaging position and a grip releasing position. In the grip receiving position, the wall 436 of the grip engaging member receiver cup 424 holds the grip members 422 in the second coupler 404 engaging position, wherein the grip member 422 is inserted within groove 440. In the grip 422 releasing position, the wall 436 of the axially moving cup 424 moves from a position radially outwardly of the grip 422, to a position axially offset from the grip 422, to permit the grip member 422 to move radially in aperture 494 to move out of the groove 440 and into the second coupler 404 release position.

The second body element 418 is best shown in FIGS. 21, 23, 24 and 26 as including a distally disposed, relatively enlarged diameter radially outwardly extending flange 498, that includes a radially extending, axially proximally facing surface 500, and a radially extending, axially distally facing surface 502. Axially distally facing surface 502 is provided for placement against the proximal facing surface of the second coupler 404. A proximally disposed, relatively reduced diameter cylindrical portion 506 extends proximally from the flange 498 and terminates in a proximal end 508 that comprises an annular lip that faces axially proximal.

An array of vent passages 510, extend generally radially through the cylindrical wall outer surface 506, between the cylindrical wall outer surface 506 and the radially inwardly facing interior surface 514 of the second body element 418. The cylindrical interior wall 514 defines an axially extending interior passageway 512, that extends all the way through the second body element 418.

As discussed above, the slots 484 of the second body element are provided for receiving the lugs 482 of the first body element 416, to couple together the first and second body elements 416, 418.

Preferably, the device is assembled by first threadedly engaging the first body element 416, receiving cup 424 and spring 430 into the piston 397. The second body element 418 is then coupled to the first body element 416 by the slots 484 being aligned so that the lugs 482 of the first body element 416 can pass through the slots 484. The second body element 418 is then pressed downwardly against the urging of washer-like spring 488 to compress spring 488, and to provide a gap between the upper surfaces of the flange 486, and the lower surfaces of the lug 482.

The second body element 418 is then rotated approximately 90°, and released. The spring 488 then urges the flange 486 into the underside surface of the lugs 482, to fixedly position the second body element 418 and first body element 416 together.

Figure 21:
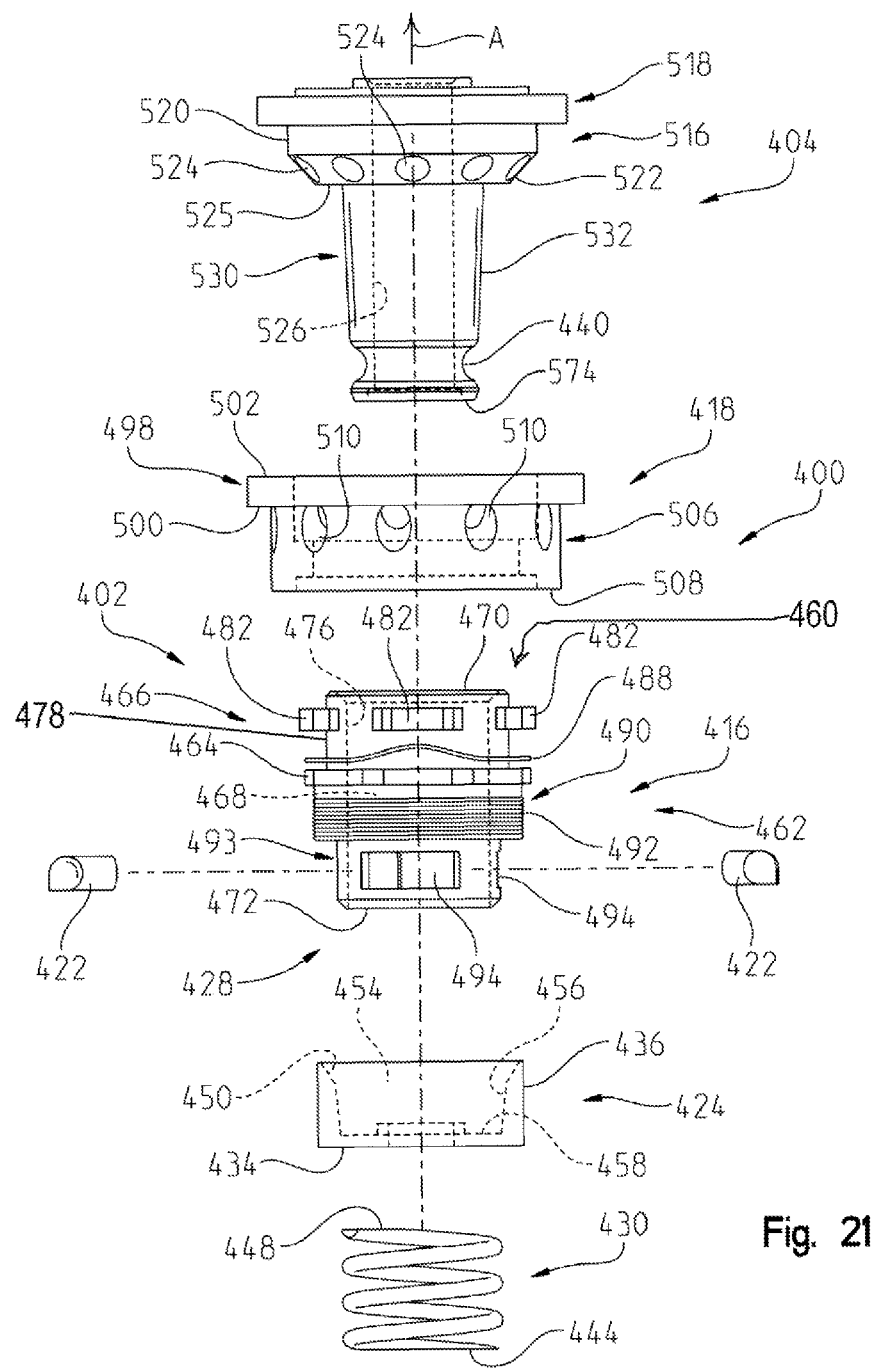
FIG. 21 is an exploded side view of a second alternate embodiment coupler of the present invention.
Figure 22:
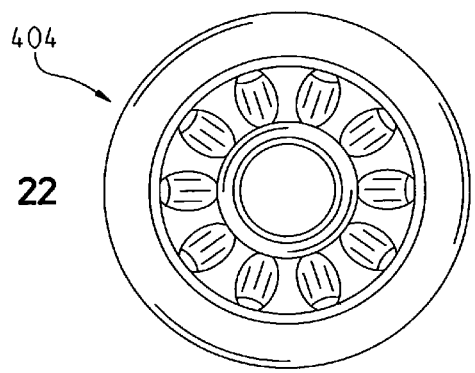
FIG. 22 is a distal end view of the second coupler member of the second alternate embodiment coupler of the present invention.
Figure 26:
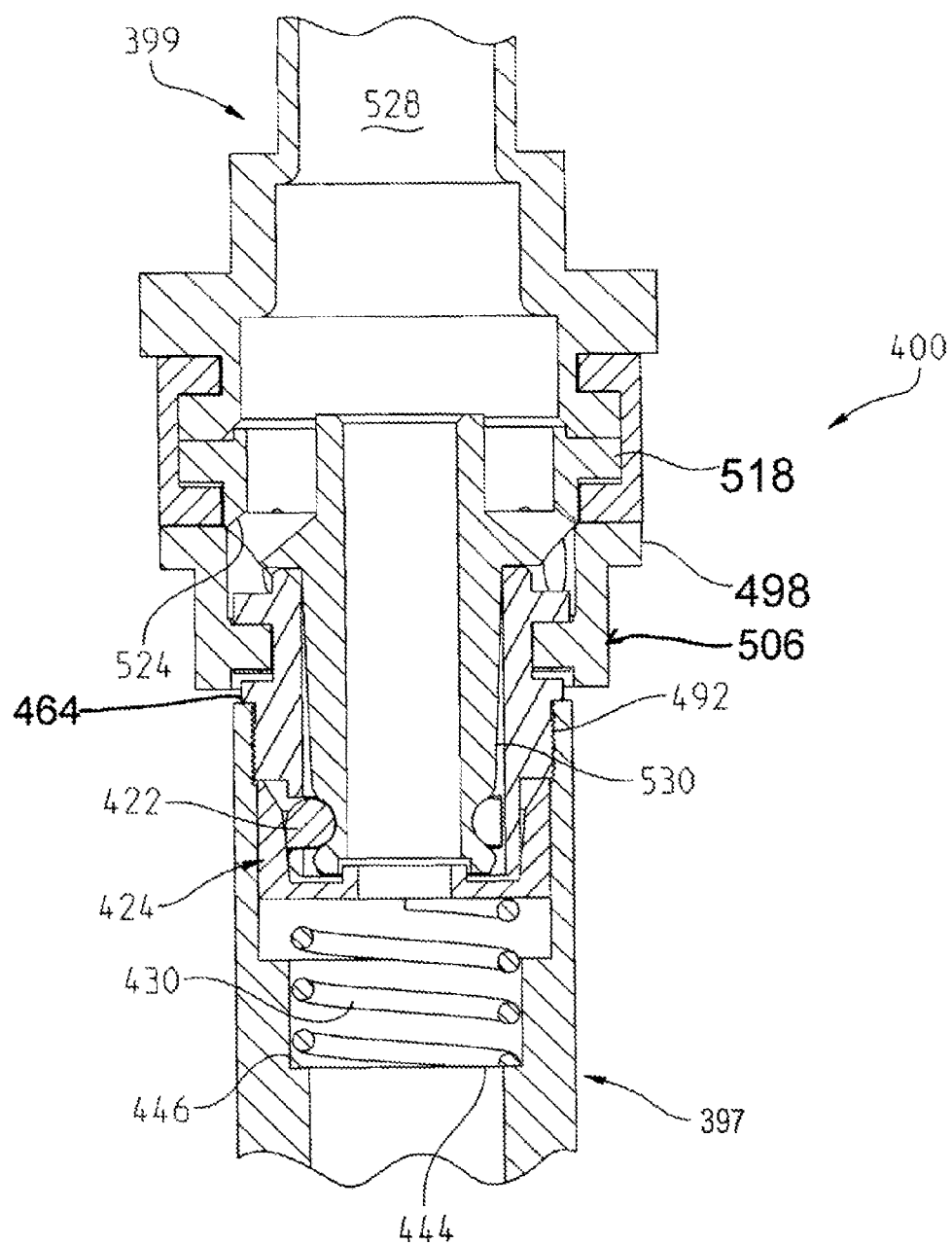
FIG. 26 is a sectional, assembled view of the second alternate embodiment coupler member coupling a piston to a plunger.

As best shown in FIGS. 21, 22 and 26, the second coupler 404 is shown that designed to be removably coupled to the first coupler 402. The second coupler 404 includes a distally disposed base portion 516 that is disposed just proximally of the washer-shaped end member flange 518. The base portion 516 includes a cylindrical portion 520 and a frusto-conical portion 522. The frusto-conical portion 522 includes an array of a plurality of vent apertures 524.

The vent apertures 524 extend generally obliquely to the axis A of the interior passageway 526, and the coupler 400, and pass through the frusto-conical portion 522. The apertures 524 are in fluid communication with the apertures 510 of the second body element 518. The apertures 524 are also in fluid communication with the hollow interior 528 of the mold member plunger 399.

The diameter of the frusto-conical portion 522 is chosen such that the second coupler member 404 engages the second body element 418 on the frusto-conical surface 522, at or close to the point where the frusto-conical surface intersects with the radially extending surface 525. The axially extending socket-engaging member has a frusto-conical exterior surface 532 that includes an annular grip receiving recessed groove 440, that is disposed adjacent to the proximal end 574 of the frusto-conical exterior surface 532.

The axially extending interior passageway 526 has a generally cylindrical wall so that the interior passageway 526 has a generally constant diameter throughout its length. The axially extending interior passageway 526 is open at each of its proximal and distal ends, and is sized to receive the tool 284.

Having described the invention in detail with reference to certain preferred embodiments, it will be appreciated that the invention is not limited to the preferred embodiment herein, but is limited only to the broadest scope of variations, modifications, and equivalents allowable under the broadest reading of the appended claims.

What is claimed is:

1. A quick connect coupler for use with a glass container molding machine for coupling a mold member to a mold moving member, the quick connect coupler comprising:
a first coupler member configured for being coupled to one of the mold member and the mold moving member, and a second coupler member configured for being coupled to the other of the mold member and mold moving member,
the first coupler member including: a first coupler body, at least one grip member movable relative to the first coupler body between a second coupler member engaging position and a second member release position, a non-threaded grip engaging member movable between a grip engaging position wherein the grip engaging member holds the grip member in the second coupler member engaging position; and upon an exertion of an axially directed force in a direction away from the second coupling member, a grip releasing position wherein the grip engaging member permits the grip member to move to the second coupler member release position, a biasing member engagable with the non-threaded grip engaging member and the one of the mold member and the mold moving member to which the first coupler member is coupled for biasing the first coupling member into the grip engaging position, and
wherein the second coupler member is selectively engageable with the first coupler member, the second coupler member including a grip receiving portion for receiving the grip member when the grip member is in the second member engaging position.

2. The quick connect coupler of claim 1 wherein the second coupler member includes a fastener configured to fasten the second coupler member to the mold member.

3. The quick connect coupler of claim 1 wherein the first coupler member includes an axially extending passageway for receiving the second coupler member, and also for receiving a coupler engagement tool configured for engaging and moving the grip engaging member.

4. The quick connect coupler of claim 3 wherein the grip members comprise at least two grip members captured by the first coupler body and movable in a first direction relative to the first coupler body between the second coupler member engaging position and the second member release position, and wherein the grip engaging member moves in a second direction generally perpendicular to the first direction when moving between the second member engaging position and the second coupler member release position.

5. The quick connect coupler of claim 4 wherein the first coupler body includes at least two grip member receiving slots for capturing the at least two grip members and wherein the second coupler member includes an axially extending member insertable in the slot, and an exterior surface including a recessed groove portion sized for receiving the at least two grip members, the at least two grip members being insertable into the groove portion when in the coupler engaging position, wherein the engagement of the at least two grip members and the groove portion prevents axial movement of the second coupler member to thereby maintain the second coupler member in a fixed position within the coupler.

6. The quick connect coupler of claim 1 wherein the first coupler member includes an axially extending passageway for receiving a grip engagement tool configured for engaging the grip engaging member to permit the grip engagement tool to move the grip engaging member between the grip engaging position and the grip releasing position.

7. The quick connect coupler of claim 1 wherein the grip engaging member includes a base portion and a wall portion, wherein the grip engaging tool engages and exerts an axially directed force against the base portion of the grip engaging member to move the grip engaging member into the grip releasing position.

8. The quick connect coupler of claim 1 further comprising a biasing member for movably biasing the grip engaging member into the second coupler member engaging position, wherein the grip engaging member is generally cup shaped, and includes a grip engaging tool receiving portion and a grip member engaging portion, wherein the grip engaging tool engages the grip receiving portion and moves the grip engaging member in a direction away from the second coupling member and into the grip release position.

9. The quick connect coupler of claim 1 wherein the first coupler body includes a first body element and a second body element, the first body element configured to be coupled to mold moving member, and the second body element configured to provide a support for the second coupler member, wherein the first and second body elements are detachably coupled to each other.

10. The quick connect coupler of claim 9 further comprising a bayonet connector for detachably coupling the first and second body elements.

11. The quick connect coupler of claim 9 where the second coupler member includes an array of venting passages, and the second body element includes an array of venting passages in fluid communication with the venting passages of the second coupler member.

12. The quick connect coupler of claim 11 wherein the second coupler member is coupled to the mold member, the mold member includes a hollow interior portion, and wherein the vent passages of the second coupler member and second body element are in fluid communication with the hollow interior portion of the mold to permit fluid communication between the hollow interior portion and an area external to the hollow interior portion.

13. The quick connect coupler of claim 9 wherein the second body element includes a radially inwardly extending bayonet connector portion, an axially extending portion containing an array of vent passages therein, and a radially outwardly extending flange portion, wherein the second coupler member includes a base portion engagable with the second body element, the base portion including an angled portion containing a plurality of vent passages there through.

14. A quick connect coupler or use with a glass container molding machine for coupling a mold member to a mold moving member, the quick connect coupler comprising:

a first coupler member having a proximal end and a distal end, the first coupler member being configured for being coupled to the mold moving member, and a second coupler member having a proximal end and a distal end, the proximal end being configured for being coupled to the first coupler and the distal end being configured for being coupled to the mold member, the first coupler member including: a first coupler body, an axially extending interior passageway, at least one grip member movable relative to the first coupler body between a second coupler member engaging position and a second coupler member release position, a non-threaded grip engaging member disposed adjacent the proximal end of the first coupler member and being movable upon an exertion of an axially directed force in a direction away from the second coupling member, from a grip engaging position wherein the grip engaging member holds the grip member in the second coupler member engaging position; to a grip releasing position wherein the grip engaging member permits the grip member to move to the second coupler member release position, a biasing member engagable with the non-threaded grip engaging member and the one of the mold member and the mold moving member to which the first coupler member is coupled for biasing the first coupling member into the grip engaging position, and wherein the second coupler member is selectively engageable with the first coupler member, the second coupler member including a grip receiving portion for receiving the grip member when the grip member is in the second member engaging position.

15. The quick connect coupler of claim 14 wherein the axially extending passageway is configured for receiving a coupler engagement tool for engaging the grip engaging member for axially moving the grip engaging member in a proximal direction to move the grip engaging member from the second coupler member engaging position to the second coupler member release position for permitting the first coupler member to become disengaged from the second coupler member.

* * * * *